US012107346B2

(12) United States Patent
Jia

(10) Patent No.: US 12,107,346 B2
(45) Date of Patent: Oct. 1, 2024

(54) ANTENNA MODULE AND ELECTRONIC DEVICE

(71) Applicant: GUANGDONG OPPO MOBILE TELECOMMUNICATIONS CORP., LTD., Guangdong (CN)

(72) Inventor: Yuhu Jia, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 169 days.

(21) Appl. No.: 17/733,759

(22) Filed: Apr. 29, 2022

(65) Prior Publication Data

US 2022/0255229 A1 Aug. 11, 2022

Related U.S. Application Data

(63) Continuation of application No. PCT/CN2020/121887, filed on Oct. 19, 2020.

(30) Foreign Application Priority Data

Oct. 31, 2019 (CN) ......................... 201911063695.7

(51) Int. Cl.
*H01Q 21/06* (2006.01)
*H01Q 5/385* (2015.01)

(52) U.S. Cl.
CPC ........... *H01Q 5/385* (2015.01); *H01Q 21/065* (2013.01)

(58) Field of Classification Search
CPC ............ H01Q 1/22; H01Q 1/24; H01Q 1/243; H01Q 1/50; H01Q 5/10; H01Q 5/28;
(Continued)

(56) References Cited

U.S. PATENT DOCUMENTS

2005/0110685 A1 5/2005 Frederik du Toit
2018/0358701 A1 12/2018 Gimersky
(Continued)

FOREIGN PATENT DOCUMENTS

CN 105932419 A 9/2016
CN 106549232 A 3/2017
(Continued)

OTHER PUBLICATIONS

Extended European Search Report for EP Application 20883091.9 mailed Nov. 7, 2022. (11 pages).
(Continued)

*Primary Examiner* — Hoang V Nguyen
(74) *Attorney, Agent, or Firm* — Young Basile Hanlon & MacFarlane, P.C.

(57) ABSTRACT

An antenna module and an electronic device are provided in the present disclosure. The antenna module includes a first antenna radiator and a first parasitic radiator. The first antenna radiator is configured to radiate a first radio frequency (RF) signal and resonate at a first frequency point. The first parasitic radiator and the first antenna radiator are located on a same plane and are spaced apart from each other, or the first parasitic radiator and the first antenna radiator are located on different planes. The first parasitic radiator is coupled with the first antenna radiator to radiate the first RF signal, and the first parasitic radiator is configured to resonate at a second frequency point, where the second frequency point is different from the first frequency point.

17 Claims, 14 Drawing Sheets

(58) Field of Classification Search
CPC ...... H01Q 5/307; H01Q 5/385; H01Q 9/0414; H01Q 19/005; H01Q 21/065; H01Q 21/30
See application file for complete search history.

(56) References Cited

U.S. PATENT DOCUMENTS

| | | | |
|---|---|---|---|
| 2019/0020110 | A1 | 1/2019 | Paulotto et al. |
| 2019/0319367 | A1 | 10/2019 | Edwards et al. |

FOREIGN PATENT DOCUMENTS

| | | | | | |
|---|---|---|---|---|---|
| CN | 107046183 | A | | 8/2017 | |
| CN | 107516763 | A | | 12/2017 | |
| CN | 107732459 | A | | 2/2018 | |
| CN | 108539395 | A | | 9/2018 | |
| CN | 108832288 | A | | 11/2018 | |
| CN | 109301472 | A | | 2/2019 | |
| CN | 109546326 | A | | 3/2019 | |
| CN | 209515999 | U | | 10/2019 | |
| JP | 201592658 | A | * | 5/2015 | ............. H01Q 13/08 |
| KR | 101014347 | B1 | | 2/2011 | |
| KR | 101014352 | B1 | | 2/2011 | |
| WO | WO-2019054094 | A1 | * | 3/2019 | ............... H01Q 1/52 |
| WO | 2019070509 | A1 | | 4/2019 | |

OTHER PUBLICATIONS

ETSI TS 138 101-2 V15.3.0 (Oct. 2018); 108 pages; Oct. 2018; 5G; NR; User equipment (UE); radio transmission and reception; Part 2: Range 2 Standalone (3GPP TS 38.101-2 version 15.3.0 Release 15).
3GPP TR 38.803 V0.2.0 (Oct. 2016); 3rd Generation Partnership Project; Technical Specification Group Radio Access Network; Study on New Radio Access Technology; RF and co-existence aspects (Release 14); Oct. 2016.
China First Office Action with English Translation issued in corresponding CN application No. 201911063695.7 dated Feb. 20, 2021.
China Notification to Grant Patent Right for Invention with English Translation issued in corresponding CN application No. 201911063695.7 dated Aug. 5, 2021.
International search report with English Translation issued in corresponding international application No. PCT/CN2020/121887 dated Jan. 11, 2021.

* cited by examiner

26 GHz X-polarization

26 GHz Y-polarization

ANTENNA MODULE AND ELECTRONIC DEVICE

CROSS-REFERENCE TO RELATED APPLICATION(S)

This application is a continuation application of International Application No. PCT/CN2020/121887, filed on Oct. 19, 2020, which claims priority to Chinese Patent Application No. 201911063695.7, filed on Oct. 31, 2019, the entire disclosures of both of which are incorporated herein by reference.

TECHNICAL FIELD

This disclosure relates to the field of electronic devices, and in particular to an antenna module and an electronic device.

BACKGROUND

With development of mobile communication technology, the traditional 4th-generation (4G) mobile communication can no longer meet people's requirements. The 5th-generation (5G) mobile communication is favored by users because of its high communication speed. For example, a data transmission speed in the 5G mobile communication is hundreds of times faster than that in the 4G mobile communication. The 5G mobile communication is mainly implemented via millimeter wave (mmWave) signals, however, when a mmWave antenna is applicable to an electronic device, a mmWave antenna module has poor communication effect.

SUMMARY

An antenna module is provided in the present disclosure. The antenna module includes a first antenna radiator and a first parasitic radiator. The first antenna radiator is configured to radiate a first radio frequency (RF) signal and resonate at a first frequency point. The first parasitic radiator and the first antenna radiator are located on a same plane and are spaced apart from each other, or the first parasitic radiator and the first antenna radiator are located on different planes. The first parasitic radiator is coupled with the first antenna radiator to radiate the first RF signal, and the first parasitic radiator is configured to resonate at a second frequency point, where the second frequency point is different from the first frequency point.

An electronic device is further provided in the present disclosure. The electronic device includes a controller and an antenna module. The controller is electrically connected with the antenna module, and the antenna module is configured to operate under control of the controller.

An antenna module is provided in the present disclosure. The antenna module includes a first antenna radiator, a first parasitic radiator, and a second antenna radiator. The first antenna radiator is configured to radiate a RF signal and resonate at a first frequency point. The first parasitic radiator and the first antenna radiator are located on a same plane and are spaced apart from each other, or the first parasitic radiator and the first antenna radiator are located on different planes. The first parasitic radiator is coupled with the first antenna radiator to radiate the first RF signal, and the first parasitic radiator is configured to resonate at a second frequency point, where the second frequency point is different from the first frequency point. The second antenna radiator is stacked with the first antenna radiator and is configured to radiate a second RF signal, where a frequency band of the second RF signal is different from a frequency band of the first RF signal.

BRIEF DESCRIPTION OF DRAWINGS

In order to describe technical solutions of implementations of the present disclosure more clearly, the following will give a brief introduction to the accompanying drawings used for describing the implementations. Apparently, the accompanying drawings hereinafter described are some implementations of the present disclosure. Based on these drawings, those of ordinary skill in the art can also obtain other drawings without creative effort.

DETAILED DESCRIPTION

Figure 1:
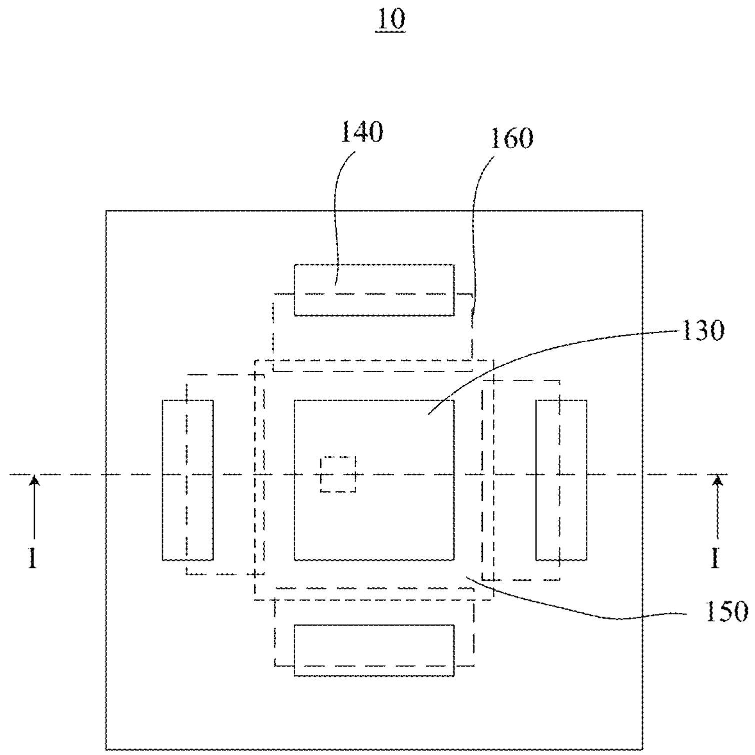
FIG. 1 is a top view illustrating an antenna module provided in implementations of the present disclosure.

An antenna module is provided in the present disclosure. The antenna module includes a first antenna radiator and a first parasitic radiator. The first antenna radiator is configured to radiate a first radio frequency (RF) signal and resonate at a first frequency point. The first parasitic radiator and the first antenna radiator are located on a same plane and are spaced apart from each other, or the first parasitic radiator and the first antenna radiator are located on different planes. The first parasitic radiator is coupled with the first antenna radiator to radiate the first RF signal, and the first parasitic radiator is configured to resonate at a second frequency point, where the second frequency point is different from the first frequency point.

In an implementation, the antenna module further includes a second antenna radiator and a second parasitic radiator. The second antenna radiator is stacked with the first antenna radiator and configured to radiate a second RF signal, where a frequency band of the second RF signal is different from a frequency band of the first RF signal. The second parasitic radiator and the second antenna radiator are located on a same plane and are spaced apart from each other, or the second parasitic radiator is stacked with the second antenna radiator. The second parasitic radiator is coupled with the second antenna radiator to radiate the second RF signal.

In an implementation, the antenna module further includes a RF chip. The RF chip is electrically connected with the first antenna radiator, each of the first antenna radiator and the second antenna radiator is a conductive patch, and the first antenna radiator is farther away from the RF chip than the second antenna radiator, where the frequency band of the first RF signal is higher than the frequency band of the second RF signal.

In an implementation, when the second parasitic radiator is stacked with the second antenna radiator, the second parasitic radiator is farther away from the RF chip than the second antenna radiator.

In an implementation, the second antenna radiator defines a through hole. The antenna module further includes a feeding member. The feeding member penetrates through the through hole and is electrically connected with the RF chip and the first antenna radiator, and the feeding member is insulated from the second antenna radiator.

In an implementation, the first parasitic radiator is implemented as multiple first parasitic radiators, and a center of the multiple first parasitic radiators on a plane where the first parasitic radiator and the first antenna radiator are located is coincident with a center of the first antenna radiator.

In an implementation, the frequency band of the first RF signal is higher than the frequency band of the second RF signal, each of the first antenna radiator and the second antenna radiator is a conductive patch, and a size of the first antenna radiator is less than a size of the second antenna radiator.

In an implementation, the frequency band of the first RF signal is higher than the frequency band of the second RF signal, the first antenna radiator is a conductive patch, the second antenna radiator is a conductive patch and defines a first hollow structure penetrating through two opposite surfaces of the second antenna radiator, a size of an outer contour of the first antenna radiator is greater than or equal to a size of an outer contour of the second antenna radiator, and a difference between a size of the first antenna radiator and a size of the second antenna radiator is larger with increasing of an area of the first hollow structure.

In an implementation, the frequency band of the first RF signal is higher than the frequency band of the second RF signal, and the first antenna radiator is a conductive patch and defines a first hollow structure penetrating through two opposite surfaces of the first antenna radiator. The second antenna radiator is a conductive patch and defines a second hollow structure penetrating through two opposite surfaces of the second antenna radiator. A size of an outer contour of the first antenna radiator is less than or equal to a size of an outer contour of the second antenna radiator, and an area of the first hollow structure is greater than an area of the second hollow structure.

In an implementation, the first parasitic radiator is a rectangular conductive patch, and the first parasitic radiator has a first edge close to the first antenna radiator and a second edge connected with the first edge, where a length of the first edge is greater than a length of the second edge, the first edge is configured to adjust a resonant frequency of the first parasitic radiator, and the second edge is configured to adjust an impedance matching degree between the first parasitic radiator and the first antenna radiator.

In an implementation, the first antenna radiator is a rectangular conductive patch, a length of the first antenna radiator ranges from 1.6~2.0 mm, a width of the second antenna radiator ranges from 1.6~2.0 mm, the length of the first edge of the first parasitic radiator is equal to a length of an edge of the first antenna radiator, the length of the second edge ranges from 0.2~0.9 mm, and a horizontal distance from the first parasitic radiator to the first antenna radiator satisfies 0.2~0.8 mm.

In an implementation, the second antenna radiator is configured to resonate at a third frequency point, and the second parasitic radiator is configured to resonate at a fourth frequency point, where the third frequency point is different from the fourth frequency point.

In an implementation, the second parasitic radiator is implemented as multiple second parasitic radiators, and an orthogonal projection of the multiple second parasitic radiators on a plane where the second antenna radiator is located is partially coincident with a region where the second antenna radiator is located.

In an implementation, a center of the region where the second antenna radiator is located is coincident with a center of the orthogonal projection of the multiple second parasitic radiators on the plane where the second antenna radiator is located.

In an implementation, the second antenna radiator is a rectangular conductive patch, a length of the second antenna radiator ranges from 2.0~2.8 mm, and a width of the second antenna radiator ranges from 2.0~2.8 mm. The second parasitic radiator is a rectangular conducive patch, a length of a long edge of the second parasitic radiator is equal to a length of a long edge of the second antenna radiator, and a length of a short edge of the second parasitic radiator ranges from 0.2~0.9 mm. When the second parasitic radiator is stacked with the second antenna radiator, a distance from the second parasitic radiator to the second antenna radiator ranges from 0~0.6 mm.

In an implementation, the frequency band of the second RF signal includes frequency band n257, frequency band n258, and frequency band n261, and the frequency band of the first RF signal includes frequency band n260.

In an implementation, the antenna module includes multiple antenna units arranged in an array. Each antenna module unit includes the first antenna radiator, the first parasitic radiator, the second antenna radiator, and the second parasitic radiator, and multiple metallization-via-hole grids are defined between adjacent antenna units.

In an implementation, an electronic device is further provided in the present disclosure. The electronic device includes a controller and the antenna module which is illustrated in any of the above implementations. The controller is electrically connected with the antenna module, and the antenna module is configured to operate under control of the controller.

In an implementation, the electronic device includes a battery cover. The antenna module has a radiation surface facing the battery cover, where the radiation surface of the antenna module is configured to radiate the first RF signal and the second RF signal.

In an implementation, the electronic device includes a screen. The antenna module has a radiation surface facing the screen, where the radiation surface of the antenna module is configured to radiate the first RF signal and the second RF signal.

Technical solutions of implementations of the present disclosure will be described clearly and completely with reference to accompanying drawings in the implementations of the present disclosure below. Apparently, the implementations described herein are merely some implementations, rather than all implementations, of the present disclosure. Based on the implementations of the present disclosure, all other implementations obtained by those of ordinary skill in the art without creative effort shall fall within the protection scope of the disclosure.

Figure 2:
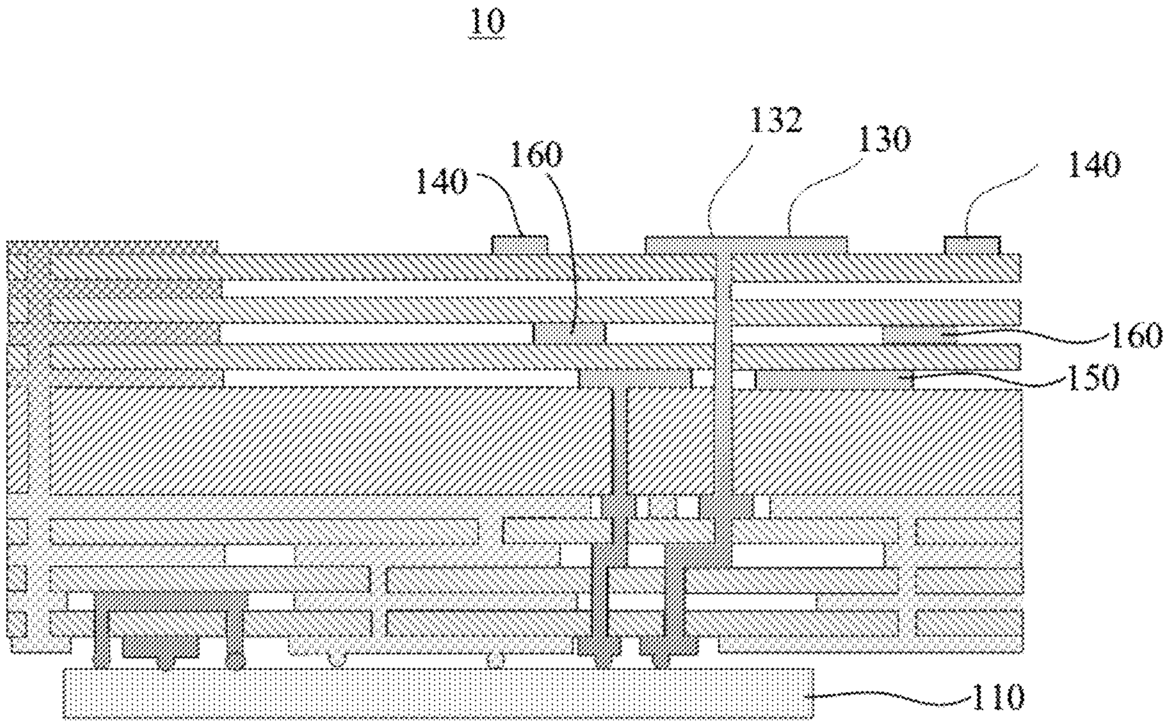
FIG. 2 is a schematic cross-sectional view of the antenna module in FIG. 1 in implementations of the present disclosure, taken along line I-I.

Reference can be made to FIG. 1 and FIG. 2 together, where FIG. 1 is a top view illustrating an antenna module provided in implementations of the present disclosure, and FIG. 2 is a schematic cross-sectional view of the antenna module in FIG. 1 in implementations of the present disclosure, taken along line I-I. It can be understood that only a partial structure of an antenna module is illustrated in FIG. 2. The antenna module 10 includes a first antenna radiator 130 and a first parasitic radiator 140. The first antenna radiator 130 is configured to radiate a first RF signal and resonate at a first frequency point. The first parasitic radiator 140 and the first antenna radiator 130 are located on a same plane and are spaced apart from each other, or the first parasitic radiator 140 and the first antenna radiator 130 are located on different planes. The first parasitic radiator 140 is coupled with the first antenna radiator 130 to radiate the first RF signal, and the first parasitic radiator 140 is configured to resonate at a second frequency point, where the second frequency point is different from the first frequency point. In an implementation, the antenna module 10 may only include the first antenna radiator 130 without the first parasitic radiator 140, and the first antenna radiator 130 is configured to radiate the first RF signal and resonate at the first frequency point.

Optionally, the antenna module 10 further includes a second antenna radiator 150 and a second parasitic radiator 160. The second antenna radiator 150 is stacked with the first antenna radiator 130 and is configured to radiate a second RF signal, where a frequency band of the second RF signal is different from a frequency band of the first RF signal. The second parasitic radiator 160 and the second antenna radiator 150 are located on a same plane and are spaced apart from each other, or the second parasitic radiator 160 is stacked with the second antenna radiator 150. The second parasitic radiator 160 is coupled with the second antenna radiator 150 to radiate the second RF signal. A frequency band of the second RF signal is different from a frequency band of the first RF signal. For example, the frequency band of the first RF signal may be higher than the frequency band of the second RF signal, or the frequency band of the first RF signal may be lower than the frequency band of the second RF signal, which depends on specific designs of the first antenna radiator 130, the first parasitic radiator 140, the second antenna radiator 150, and the second parasitic radiator 160.

The first RF signal may be, but is not limited to, a RF signal of a mmWave frequency band or a RF signal of a terahertz frequency band. At present, in the 5th generation (5G) mobile communication technology, according to the protocol of the 3GPP technical specification (TS) 38.101, two frequency bands are mainly used in the 5G new radio (NR): a frequency range 1 (FR1) band and a frequency rang 2 (FR2) band. The FR1 band has a frequency range of 450 megahertz (MHz)~6 gigahertz (GHz), and is also known as the sub-6 GHz frequency band. The FR2 band has a frequency range of 24.25 Ghz-52.6 Ghz, and belongs to the mmWave frequency band. The 3GPP Release 15 specifies that present 5G mmWave frequency bands include: n257 (26.5~29.5 GHz), n258 (24.25~27.5 GHz), n261 (27.5~28.35 GHz), and n260 (37~40 GHz). Correspondingly, the second RF signal may be, but is not limited to, the RF signal of the mmWave frequency band or the RF signal of the terahertz frequency band.

The first antenna radiator 130 may be made of a metallic conductive material or a non-metallic conductive material, and when the first antenna radiator 130 is made of the non-metallic conductive material, the first antenna radiator 130 may be non-transparent or transparent. The first parasitic radiator 140 may be made of a metallic conductive material or a non-metallic conductive material, and when the first parasitic radiator 140 is made of the non-metallic conductive material, the first parasitic radiator 140 may be non-transparent or transparent. Correspondingly, a material of the second antenna radiator 150 may be, but is not limited to, a metallic conductive material or a non-metallic conductive material, and when the second antenna radiator 150 is made of the non-metallic conductive material, the second antenna radiator 150 may be non-transparent or transparent. The second parasitic radiator 160 may be made of a metallic conductive material or a non-metallic conductive material, and when the second parasitic radiator 160 is made of the non-metallic material, the second parasitic radiator 160 may be non-transparent or transparent. The first antenna radiator 130, the first parasitic radiator 140, the second antenna radiator 150, and the second parasitic radiator 160 may be made of the same material or different materials.

Figure 3:
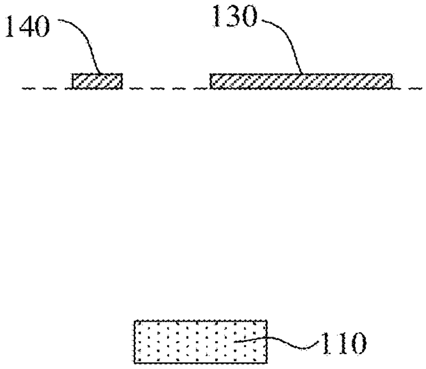
FIG. 3 is a schematic view illustrating arrangement of a first parasitic radiator and a first antenna radiator of an antenna module on a same plane provided in implementations of the present disclosure.

Reference can be made to FIG. 3, which is a schematic view illustrating arrangement of a first parasitic radiator and a first antenna radiator of an antenna module on a same plane provided in implementations of the present disclosure. In this implementation, that the first parasitic radiator 140 and the first antenna radiator 130 are located on the same plane includes that one surface of the first parasitic radiator 140 and one surface of the first antenna radiator 130 are located on the same layer, for example, a surface of the first parasitic radiator 140 adjacent to a RF chip 110 of the antenna module 10 and a surface of the first antenna radiator 130 adjacent to the RF chip 110 of the antenna module 10 are located on the same layer. In FIG. 3, a dashed line represents the same surface. In the schematic view of this implementation, only the first antenna radiator 130, the first parasitic radiator 140, and the RF chip 110 are illustrated, while other components of the antenna module 10 are omitted.

Figure 4:
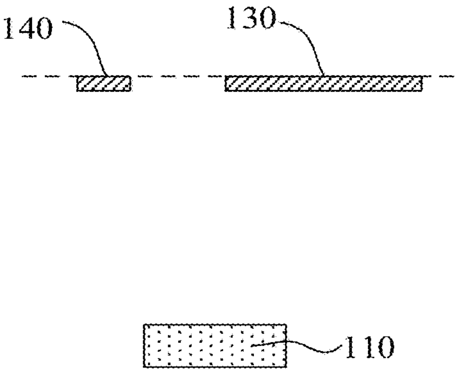
FIG. 4 is a schematic view illustrating arrangement of a first parasitic radiator and a first antenna radiator of an antenna module on a same plane provided in other implementations of the present disclosure.

Reference can be made to FIG. 4, which is a schematic view illustrating arrangement of a first parasitic radiator and a first antenna radiator of an antenna module on a same plane provided in other implementations of the present disclosure. In this implementation, a surface of the first parasitic radiator 140 away from the RF chip 110 of the antenna module 10 and a surface of the first antenna radiator 130 away from the RF chip 110 of the antenna module 10 are located on the same layer. This situation is also regarded as the first parasitic radiator 140 and the first antenna radiator 130 being located on the same plane. In FIG. 4, a dash line represents the same surface. In the schematic view of this implementation, only the first antenna radiator 130, the first parasitic radiator 140, and the RF chip 110 are illustrated, while other components of the antenna module 10 are omitted.

Figure 5:
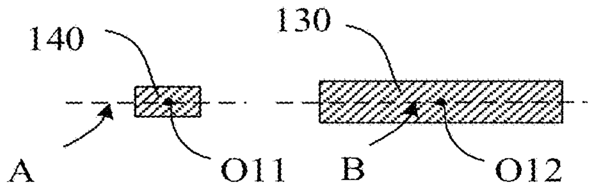
FIG. 5 is a schematic view illustrating arrangement of a first parasitic radiator and a first antenna radiator of an antenna module on a same plane provided in other implementations of the present disclosure.

Reference can be made to FIG. 5, which is a schematic view illustrating arrangement of a first parasitic radiator and a first antenna radiator of an antenna module on a same plane provided in other implementations of the present disclosure. In this implementation, a plane passing through a center O11 of the first parasitic radiator 140 and perpendicular to a normal of a radiation surface of the first parasitic radiator 140 is denoted as a first plane A, a plane passing through a center O12 of the first antenna radiator 130 and perpendicular to a normal of a radiation surface of the first antenna radiator 130 is denoted as a second plane B, and a situation that the first parasitic radiator 140 and the first antenna radiator 130 are located on the same plane further includes a situation that the first plane A and the second plane B are coplanar.

That the first parasitic radiator 140 is spaced apart from the first antenna radiator 130 may be that an insulating medium is filled between the first parasitic radiator 140 and the first antenna radiator 130, or that the first parasitic radiator 140 is only spaced apart from the first antenna radiator 130 and there is air, etc., between the first parasitic radiator 140 and the first antenna radiator 130, as long as the first parasitic radiator 140 can be coupled with the first RF signal radiated by the first antenna radiator 130.

That the second antenna radiator 150 is stacked with the first antenna radiator 130 means, that an orthogonal projection of the second antenna radiator 150 on a plane where the first antenna radiator 130 is located is at least partially coincident with a region where the first antenna radiator 130 is located.

That the second parasitic radiator 160 and the second antenna radiator 150 are located on the same plane includes that one surface of the second parasitic radiator 160 and one surface of the second antenna radiator 150 are disposed on the same layer, for example, a surface of the second parasitic radiator 160 adjacent to the RF chip 110 of the antenna module 10 and a surface of the second antenna radiator 150 adjacent to the RF chip 110 of the antenna module 10 are located on the same layer; or a surface of the second parasitic radiator 160 away from the RF chip 110 of the antenna module 10 and a surface of the second antenna radiator 150 away from the RF chip 110 of the antenna module 10 are located on the same layer. A plane passing through a center of the second parasitic radiator 160 and perpendicular to a normal of a radiation surface of the second parasitic radiator 160 is denoted as a third plane, a plane passing through a center of the second antenna radiator 150 and perpendicular to a normal of a radiation surface of the second antenna radiator 150 is denoted as a fourth plane, and a situation that the second parasitic radiator 160 and the second antenna radiator 150 are located on the same plane further includes a situation that the third plane and the fourth plane are coplanar. That the second parasitic radiator 160 is stacked with the second antenna radiator 150 means, that an orthogonal projection of the second parasitic radiator 160 on a plane where the second antenna radiator 150 is located is at least partially coincident with a region where the second antenna radiator 150 is located. When the second parasitic radiator 160 is stacked with the second antenna radiator 150, the orthogonal projection of the second parasitic radiator 160 on the plane where the second antenna radiator 150 is located is at least partially coincident with the region where the second antenna radiator 150 is located, which can improve coupling effect between the second parasitic radiator 160 and the second antenna radiator 150. For details, reference can be made to the previous descriptions about arrangement of the first parasitic radiator 140 and the first antenna radiator 130 of the antenna module 10 on the same layer, which will not be repeated or illustrated here.

That the second parasitic radiator 160 is spaced apart from the second antenna radiator 150 may be that an insulating medium is filled between the second parasitic radiator 160 and the second antenna radiator 150, or that the second parasitic radiator 160 is only spaced apart from the second antenna radiator 150 and there is air between the second parasitic radiator 160 and the second antenna radiator 150, as long as the second parasitic radiator 160 can be coupled with the second RF signal radiated by the second antenna radiator 150.

Compared to a situation that an antenna module 10 only uses one kind of RF signal to communicate in related art, the antenna module 10 of the present disclosure can radiate the first RF signal and the second RF signal, in other words, the antenna module 10 can communicate through the first RF signal and the second RF signal, such that communication effect of the antenna module 10 is improved. Furthermore, the first antenna radiator 130 of the antenna module 10 of the present disclosure can radiate the first RF signal, and the first parasitic radiator 140 is coupled with the first antenna radiator 130 to radiate the first RF signal, which can improve a communication rate when the antenna module 10 communicates through the first RF signal, thereby improving the communication effect when the antenna module 10 communicates through the first RF signal. Moreover, the second antenna radiator 150 of the antenna module 10 can radiate the second RF signal, and the second parasitic radiator 160 is coupled with the second antenna radiator 150 to radiate the second RF signal, which can improve a communication rate when the antenna module 10 communicates through the second RF signal, thereby improving the communication effect when the antenna module 10 communicates through the second RF signal.

The first antenna radiator 130 is configured to resonate at the first frequency point, and the first parasitic radiator 140 is configured to resonate at the second frequency point, where the first frequency point is different from the second frequency point.

By designing a size of the first antenna radiator 130, a size of the first parasitic radiator 140, and a distance between the first antenna radiator 130 and the first parasitic radiator 140, a resonant frequency point of the first antenna radiator 130 and a resonant frequency point of the first parasitic radiator 140 can be adjusted. When the first frequency point is different from the second frequency point, a bandwidth of the first RF signal can be expanded, such that communication performance of the antenna module 10 can be improved.

For example, a frequency band of the first RF signal generated by the first antenna radiator 130 is a first frequency band, the first antenna radiator 130 is configured to resonate at a first frequency point of the first frequency band, and the first parasitic radiator 140 is configured to resonate at a second frequency point of the first frequency band. By adjusting the size of the first antenna radiator 130, the size of the first parasitic radiator 140, and the distance between the first antenna radiator 130 and the first parasitic radiator 140, an impedance bandwidth of the first frequency band can be optimized, such that a bandwidth of the first frequency band can be expanded. For example, the first frequency band of the first RF signal generated by the first antenna radiator 130 and the first parasitic radiator 140 ranges from 37~40 GHz, in other words, frequency band n260 can be satisfied. It can be understood that the frequency band of the first RF signal generated by the first antenna radiator 130 may also be other frequency bands except a frequency band of 39 GHz.

Optionally, reference can be made to FIG. 2, and the antenna module 10 further includes the RF chip 110. The RF chip 110 is electrically connected with the first antenna radiator 130. The first antenna radiator 130 is farther away from the RF chip 110 than the second antenna radiator 150, and the frequency band of the first RF signal is higher than the frequency band of the second RF signal.

Figure 6:
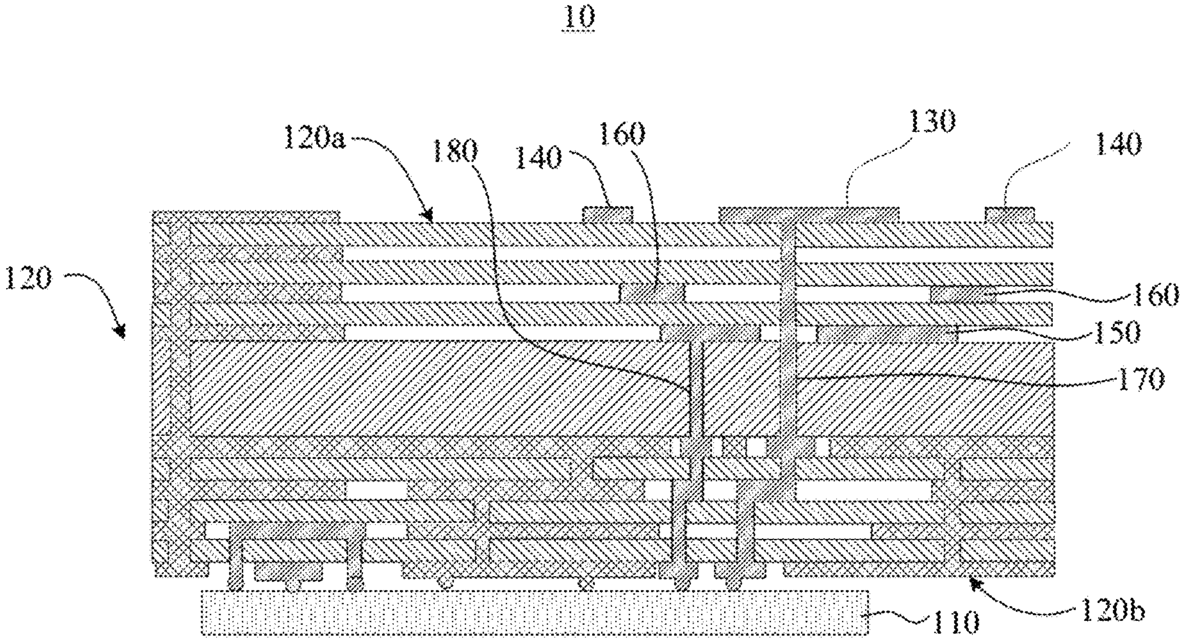
FIG. 6 is a schematic cross-sectional view of the antenna module in FIG. 1 in other implementations of the present disclosure, taken along line I-I.

Reference can be made to FIG. 6 together, which is a schematic cross-sectional view of the antenna module in FIG. 1 in other implementations of the present disclosure, taken along line I-I. The antenna module 10 includes a RF chip 110, a substrate 120, a first antenna radiator 130, a first parasitic radiator 140, a second antenna radiator 150, and a second parasitic radiator 160. The RF chip 110 is configured to generate a first excitation signal and a second excitation signal. The first antenna radiator 130 is electrically connected with the RF chip 110, and the first antenna radiator 130 is configured to receive the first excitation signal output by the RF chip 110 to generate the first RF signal. The second antenna radiator 150 is electrically connected with the RF chip 110, and the second antenna radiator 150 is configured to receive the second excitation signal output by the RF chip 110 to generate the second RF signal. The substrate 120 is configured to carry the first antenna radiator 130, the first parasitic radiator 140, the second antenna radiator 150, and the second parasitic radiator 160. The substrate 120 has a first surface **120*a* and a second surface 120*b* opposite to the first surface 120*a*. In this implementation, an example that the first antenna radiator 130 and the first parasitic radiator 140 are disposed on the first surface 120*a*, the second antenna radiator 150 and the second parasitic radiator 160 are embedded in the substrate 120, and the RF chip 110 is disposed on the second surface 120*b* is taken for illustration. For example, the RF chip 110 can be fixed to the second surface 120*b* of the substrate 120 by welding or the like. The RF chip 110 is electrically connected with the first antenna radiator 130 and the second antenna radiator 150 through a feeding member embedded in the substrate 120. For convenience of description, the feeding member is named a first feeding member 170 and a second feeding member 180, in other words, the RF chip 110 is electrically connected with the first antenna radiator 130 through the first feeding member 170 embedded in the substrate 120, and the RF chip 110 is electrically connected with the second antenna radiator 150 through a second feeding member 180 embedded in the substrate 120. The first feeding member 170 may be, but is not limited to, a feeding wire, or a feeding probe, etc. Correspondingly, the second feeding member 180** may be, but is not limited to, a feeding wire, or a feeding probe, etc.

Figure 7:
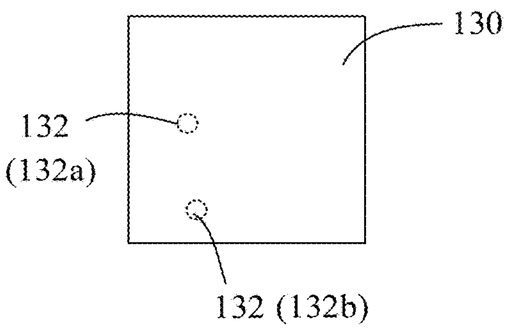
FIG. 7 is a top view illustrating a first antenna radiator in implementations of the present disclosure.

Optionally, reference can be made to FIG. 7, which is a top view illustrating a first antenna radiator in implementations of the present disclosure. The first antenna radiator 130 includes at least two first feeding points 132, each first feeding point 132 is electrically connected with the RF chip 110 through the first feeding member 170, a distance between each first feeding point 132 and a center of the first antenna radiator 130 is greater than a preset distance, which makes an output impedance of the RF chip 110 match an input impedance of the first antenna radiator 130. The input impedance of the first antenna radiator 130 can be changed by adjusting positions of the first feeding points 132, such that a matching degree between the input impedance of the first antenna radiator 130 and the output impedance of the RF chip 110 can be changed, which makes the first excitation signal generated by the RF chip 110 more converted into the first RF signal for output, such that the amount of the first excitation signal not participating in conversion into the first RF signal is reduced, thereby improving conversion efficiency of the first excitation signal into the first RF signal. It can be understood that only two first feeding points 132 are illustrated in FIG. 7, positions of the two first feeding points 132 are only for illustration, which does not limit a position of a first feeding point. In other implementations, the first feeding points 132 may also be arranged at other positions.

Furthermore, when the first antenna radiator 130 includes at least two first feeding points 132, the positions of the two first feeding points 132 are different, and dual polarization of the first RF signal radiated by the first antenna radiator 130 can be realized. Specifically, an example that the first antenna radiator 130 includes the two first feeding points 132 is taken for illustration, and the two first feeding points 132 are respectively denoted as a first feeding point 132*a* and a first feeding point 132*b*. When the first excitation signal is loaded on the first antenna radiator 130 through the first feeding point 132*a*, the first antenna radiator 130 generates a first RF signal, and a polarization direction of the first RF signal is a first polarization direction. When the first excitation signal is loaded on the first antenna radiator 130 through the first feeding point 132*b*, the first antenna radiator 130 generates a first RF signal, and a polarization direction of the first RF signal is a second polarization direction, where the second polarization direction is different from the first polarization direction. It can be seen that the first antenna radiator 130 in this implementation can realize the dual polarization. When the first antenna radiator 130 can realize the dual polarization, the communication effect of the antenna module 10 can be improved. Compared to a traditional technique in which two antennas are used to realize different polarization, the number of antennas in the antenna module 10 can be reduced in this implementation.

The second antenna radiator 150 is embedded in the substrate 120. The second parasitic radiator 160 is also embedded in the substrate 120. The second parasitic radiator 160 is disposed between the first antenna radiator 130 and the second antenna radiator 150, or the second parasitic radiator 160 and the second antenna radiator 150 are disposed on the same layer, or the second parasitic radiator 160 is disposed at a side of the second antenna radiator 150 away from the first antenna radiator 130.

The antenna module 10 is illustrated below by taking an example that the first antenna radiator 130 and the first parasitic radiator 140 are disposed on a first surface of the substrate 120 and spaced part from each other, the RF chip 110 is disposed on a second surface of the substrate 120, the second antenna radiator 150 is embedded in the substrate 120, the second parasitic radiator 160 is embedded in the substrate 120, the second parasitic radiator 160 is disposed between the second antenna radiator 150 and the first antenna radiator 130, and the antenna module 10 is prepared by a high density interconnection (HDI) process. The substrate 120 includes a core layer 121 and wiring layers 122 stacked on two opposite sides of the core layer 121. The core layer 121 is an insulating layer, and insulating layers 123 are usually disposed between the wiring layers 122. It can be understood that in other implementations, the antenna module 10 can also be realized by a process such as an integrated circuit (IC) substrate process, etc. The core layer 121 and the insulating layers 123 can adopt a high-frequency low-loss mmWave material, for example, for the high-frequency low-loss mmWave material, dielectric constant Dk=3.4 and loss factor Df=0.004. The thickness of the core layer 121 may be, but is not limited to, 0.45 mm, the thickness of all insulating layers 123 in the substrate 120 may be, but is not limited to, 0.4 mm, and the thicknesses of each insulating layer 123 in the substrate 120 may be equal or unequal.

Figure 8:
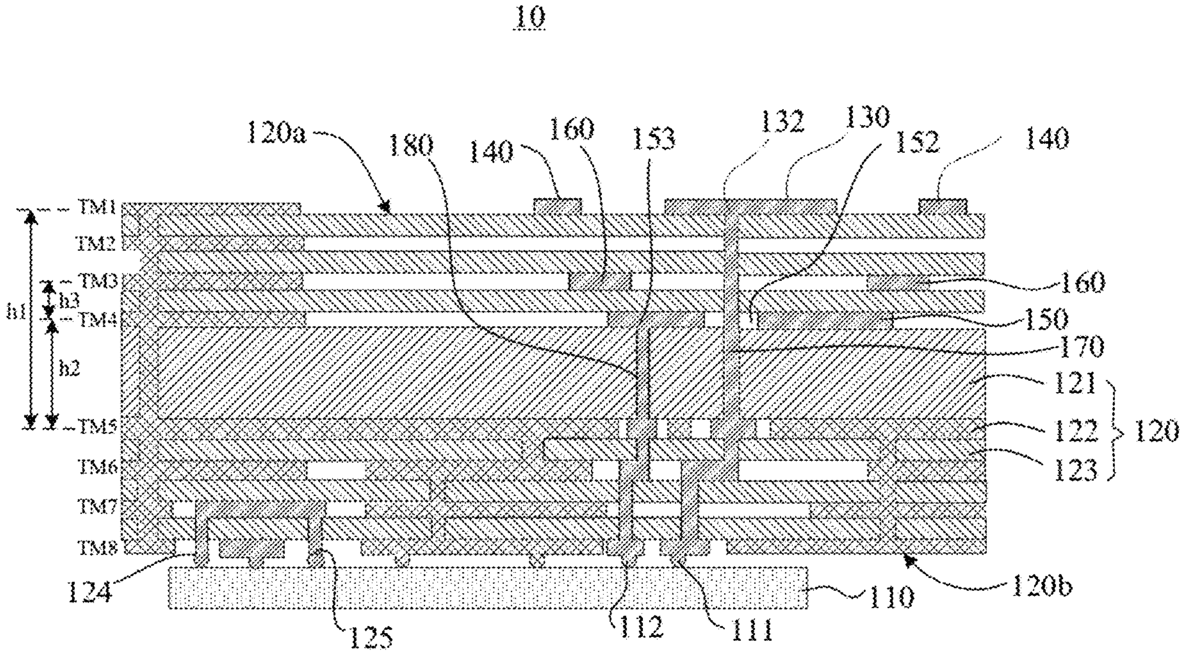
FIG. 8 is a cross-sectional view illustrating an antenna module provided in implementations of the present disclosure.

In this implementation, an example that the substrate 120 has an 8-layer structure is taken for illustration, it can be understood that in other implementations, the substrate 120 may also have other numbers of layers. Reference can be made to FIG. 8, which is a cross-sectional view illustrating an antenna module provided in implementations of the present disclosure. The substrate 120 includes a core layer 121, a first wiring layer TM1, a second wiring layer TM2, a third wiring layer TM3, a fourth wiring layer TM4, a fifth wiring layer TM5, a sixth wiring layer TM6, a seventh wiring layer TM7, and an eighth wiring layer TM8. The first wiring layer TM1, the second wiring layer TM2, the third wiring layer TM3, and the fourth wiring layer TM4 are stacked on a same surface of the core layer 121 in sequence, the first wiring layer TM1 is disposed away from the core layer 121 relative to the fourth wiring layer TM4, and a surface of the first wiring layer TM1 away from the core layer 121 is a first surface 120*a* of the substrate 120. The fifth wiring layer TM5, the sixth wiring layer TM6, the seventh wiring layer TM7, and the eighth wiring layer TM8 are stacked on a same surface of the core layer 121 in sequence, the eighth wiring layer TM8 is disposed away from the core layer 121 relative to the fifth wiring layer TM5, and a surface of the eighth wiring layer TM8 away from the core layer 121 is a second surface 120*b* of the substrate 120. Generally, the first wiring layer TM1, the second wiring layer TM2, the third wiring layer TM3, and the fourth wiring layer TM4 are wiring layers where antenna radiators can be disposed. The fifth wiring layer TM5 is a ground layer where a ground electrode is disposed. The sixth wiring layer TM6, the seventh wiring layer TM7, and the eighth wiring layer TM8 are wiring layers where a feeding network and control lines in the antenna module 10 are disposed.

In the schematic view of implementations, an example that the first antenna radiator 130 and the first parasitic radiator 140 are disposed in the first wiring layer TM1, the second parasitic radiator 160 is disposed in the third wiring layer TM3, and the second antenna radiator 150 is disposed in the fourth wiring layer TM4 is taken for illustration.

Furthermore, each of the first wiring layer TM1, the second wiring layer TM2, the third wiring layer TM3, the fourth wiring layer TM4, the sixth wiring layer TM6, the seventh wiring layer TM7, and the eighth wiring layer TM8 in the substrate 120 is electrically connected with a ground layer of the fifth wiring layer TM5. Specifically, each of the first wiring layer TM1, the second wiring layer TM2, the third wiring layer TM3, the fourth wiring layer TM4, the sixth wiring layer TM6, the seventh wiring layer TM7, and the eighth wiring layer TM8 in the substrate 120 defines a through hole, conductive materials are disposed in the through hole to electrically connect with the ground layer in the fifth wiring layer TM5, such that devices disposed in various wiring layers 122 are grounded. The devices disposed in various wiring layers 122 may be devices required for operation of the antenna module 10, for example, a device for received-signal processing, a device for emission signal processing, etc.

Moreover, a power supply line 124 and a control line 125 are further disposed in the seventh wiring layer TM7 and the eighth wiring layer TM8. The power supply line 124 and the control line 125 are electrically connected with the RF chip 110 respectively. The power supply line 124 is configured to supply the RF chip 110 with power needed by the RF chip 110, and the control line 125 is configured to transmit a control signal to the RF chip 110 to control operation of the RF chip 110.

The RF chip 110 is provided with a first output end 111 and a second output end 112 at a surface of the RF chip 110 facing the core layer 121. The first antenna radiator 130 includes at least one first feeding point 132 (reference can be made to FIG. 7). The RF chip 110 is configured to generate the first excitation signal, and the first output end 111 is configured to be electrically connected with the first feeding point 132 of the first antenna radiator 130 through the first feeding member 170, to output the first excitation signal to the first antenna radiator 130. The first antenna radiator 130 is configured to generate the first RF signal according to the first excitation signal. Correspondingly, the second antenna radiator 150 includes at least one second feeding point 153. The RF chip 110 is further configured to generate the second excitation signal, and the second output end 112 is configured to be electrically connected with the second feeding point 153 of the second antenna radiator 150 through the second feeding member 180, to output the second excitation signal to the second antenna radiator 150. The second antenna radiator 150 is configured to generate the second RF signal according to the second excitation signal. The first output end 111 and the second output end 112 face the core layer 121, such that the length of the first feeding member 170 electrically connected with the first antenna radiator 130 is relatively short, thereby reducing a loss of transmitting the first excitation signal by the first feeding member 170, which makes a generated first RF signal have a better radiation gain. Likewise, the length of the second feeding member 180 electrically connected with the second antenna radiator 150 is relatively short, thereby reducing a loss of transmitting the second excitation signal by the second feeding member 180, which makes a generated second RF signal have a better radiation gain. The first output end 111 and the second output end 112 may also be connected with the substrate 120 by a welding process. The first output end 111 and the second output end 112 described above are connected with the substrate 120 by the welding process, and the first output end 111 and the second output end 112 face the core layer 121, therefore, this process is named a flip-chip process, and that the RF chip 110 is electrically connected with the first antenna radiator 130 and the second antenna radiator 150 respectively by a substrate process or the HDI process, so as to realize that the RF chip 110 is interconnected with the first antenna radiator 130 and the second antenna radiator 150 respectively. The first antenna radiator 130, the first parasitic radiator 140, the second antenna radiator 150, and the second parasitic radiator 160 may adopt forms of conductive patches (also called patch antennas) or dipole antennas. The first feeding member 170 may be a feeding conductive wire or a feeding probe. The second feeding member 180 may be a feeding conductive wire or a feeding probe.

Generally, for an antenna radiator in a form of a conductive patch, a larger frequency band of a RF signal leads to a smaller size of the antenna radiator. When the frequency band of the first RF signal is higher than the frequency band of the second RF signal, the size of the first antenna radiator 130 is less than the size of the second antenna radiator 150. When the first antenna radiator 130 is farther away from the RF chip 110 than the second antenna radiator 150, the second antenna radiator 150 will not be completely blocked by the first antenna radiator 130, and the second RF signal radiated by the second antenna radiator 150 will not be shielded or attenuated due to being blocked by the first antenna radiator 130, therefore, radiation performance of the antenna module 10 can be improved.

Optionally, when the second parasitic radiator 160 is stacked with the second antenna radiator 150, the second parasitic radiator 160 is disposed farther away from the RF chip 110 than the second antenna radiator 150.

The second parasitic radiator 160 is coupled with the second antenna radiator 150 to radiate the second RF signal, the second parasitic radiator 160 is disposed farther away from the RF chip 110 than the second antenna radiator 150, which can reduce shielding of the second RF signal radiated by the second parasitic radiator 160 by the second antenna radiator 150, and help to improve the radiation performance of the antenna module 10.

Optionally, reference can be made to FIG. 8 again, in this implementation, the second antenna radiator 150 defines a through hole 152. The antenna module 10 further includes the first feeding member 170. The first feeding member 170 penetrates through the through hole 152 and is electrically connected with the RF chip 110 and the first antenna radiator 130, and the first feeding member 170 is insulated from the second antenna radiator 150.

The second antenna radiator 150 defines the through hole 152, on one hand, the though hole 152 can be used for the first feeding member 170 to penetrate through, on the other hand, for radiating RF signals in the same frequency band, compared to a second antenna radiator 150 without the through hole 152, the second antenna radiator 150 with the through hole 152 can change distribution of a surface current on the second antenna radiator 150, such that the size of the second antenna radiator 150 with the through hole 152 is less than the size of the second antenna radiator 150 without the though hole 152, which is beneficial to miniaturization of the antenna module 10.

It can be understood that, in FIG. 8 and its related descriptions, an example that the substrate 120 includes a core layer and 8-layer wiring layers is taken for illustration. It can be understood that in other implementations, the antenna module 10 may be in other forms, which is not limited to that the substrate 120 includes the core layer and the 8-layer wiring layers.

Figure 9:
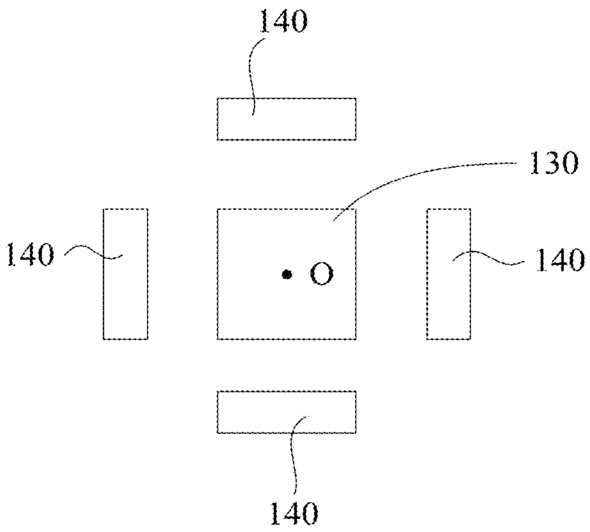
FIG. 9 is a top view illustrating a first parasitic radiator and a first antenna radiator in implementations of the present disclosure.

Reference can be made to FIG. 9, which is a top view illustrating a first parasitic radiator and a first antenna radiator in implementations of the present disclosure. Optionally, the first parasitic radiator 140 is implemented as multiple first parasitic radiators 140, and a center of the multiple first parasitic radiators 140 on a plane where the first parasitic radiator 140 and the first antenna radiator 130 are located is coincident with a center of the first antenna radiator 130. It should be noted that the multiple first parasitic radiators 140 are taken as a whole, and a center of the whole is denoted as O, then the center of the first antenna radiator 130 is also O.

The center of the multiple first parasitic radiators 140 on the plane where the first parasitic radiator 140 and the first antenna radiator 130 are located is coincident with the center of the first antenna radiator 130, in other words, the multiple first parasitic radiators 140 are uniformly distributed around the first antenna radiator 130, arrangement in this way can improve uniformity of coupling between each first parasitic radiator 140 and the first antenna radiator 130, which helps to improve uniformity of signal strength of the first RF signal radiated by each first parasitic radiator 140 being coupled with the first antenna radiator 130, thereby improving the communication effect of the antenna module 10.

The number of the first parasitic radiator 140 may be, but is not limited to, four. In FIG. 9, an example that the number of the first parasitic radiator 140 is four and the first antenna radiator 130 is square is taken for illustration. Each first parasitic radiator 140 corresponds to one edge of the first antenna radiator 130, and distances between an edge of each first parasitic radiator 140 close to the first antenna radiator 130 and an edge of the first antenna radiator 130 close to the first parasitic radiator 140 are equal. It can be understood that in other implementations, the number of the first parasitic radiator 140 is not limited to four, as long as the first parasitic radiator 140 can be coupled with the first antenna radiator 130.

Figure 10:
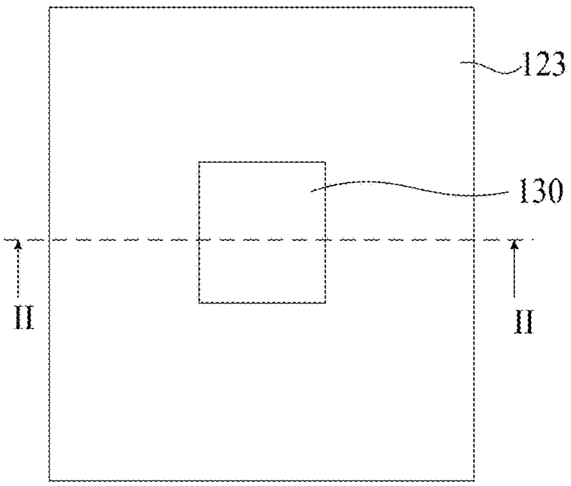
FIG. 10 is a top view illustrating an antenna module in implementations of the present disclosure.
Figure 11:
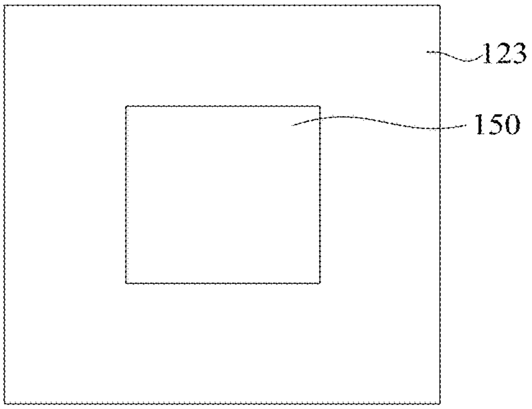
FIG. 11 is a perspective view illustrating an antenna module in implementations of the present disclosure.
Figure 12:
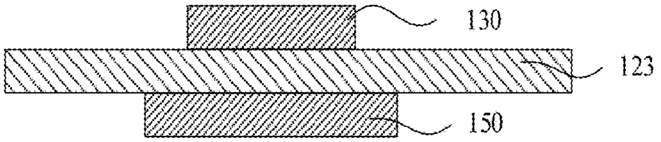
FIG. 12 is a cross-sectional view of the antenna module in FIG. 10, taken along line II-II.

Reference can be made to FIG. 10, FIG. 11, and FIG. 12, where FIG. 10 is a top view illustrating an antenna module in implementations of the present disclosure, FIG. 11 is a perspective view illustrating an antenna module in implementations of the present disclosure, and FIG. 12 is a cross-sectional view of the antenna module in FIG. 10, taken along line II-II. FIG. 10 to FIG. 12 are only used to illustrate a size relationship between the first antenna radiator 130 and the second antenna radiator 150, other components of the antenna module 10 such as the second antenna radiator 150, the second parasitic radiator 160, etc., are omitted, and an example that the first antenna radiator 130 is spaced apart from the second antenna radiator 150 only through one insulating layer 123 is taken for illustration. It can be understood that in other implementations, other layer structures may also be disposed between the first antenna radiator 130 and the second antenna radiator 150, as long as the first antenna radiator 130 is spaced apart from the second antenna radiator 150. The second antenna radiator 150 illustrated in FIG. 11 is illustrated at the same viewing angle as the first antenna radiator 130 illustrated in FIG. 10. In an implementation, the frequency band of the first RF signal is higher than the frequency band of the second RF signal, each of the first antenna radiator 130 and the second antenna radiator 150 is a conductive patch, and the size of the first antenna radiator 130 is less than the size of the second antenna radiator 150.

In this implementation, each of the first antenna radiator 130 and the second antenna radiator 150 is a conductive patch and does not define a hollow structure. For an antenna radiator in a form of a conductive patch, the larger frequency band of the RF signal leads to the smaller size of the antenna radiator, and when the frequency band of the first RF signal is higher than the frequency band of the second RF signal, the size of the first antenna radiator 130 is less than the size of the second antenna radiator 150. Each of the first antenna radiator 130 and the second antenna radiator 150 is the conductive patch, such that the first antenna radiator 130 and the second antenna radiator 150 have relatively great structural strength.

Figure 13:
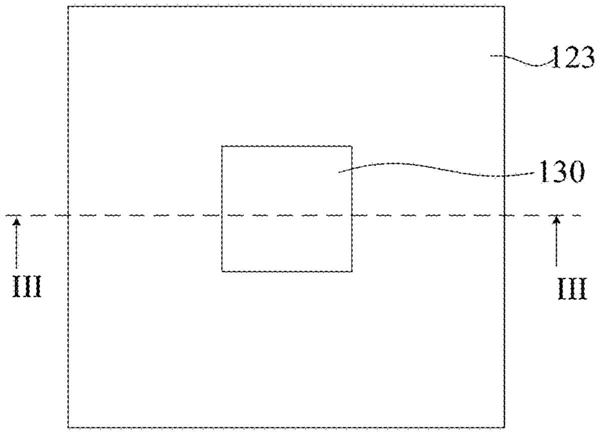
FIG. 13 is a top view illustrating an antenna module in other implementations of the present disclosure.
Figure 14:
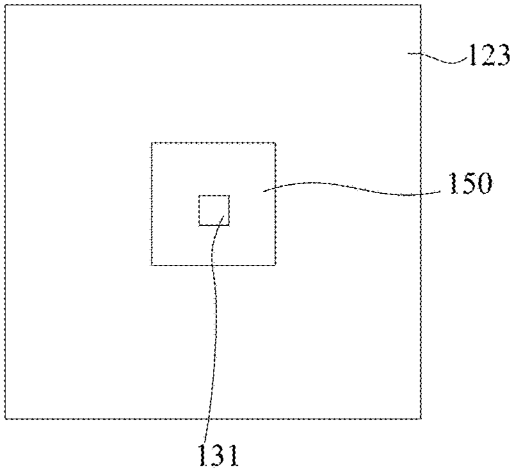
FIG. 14 is a perspective view illustrating an antenna module in other implementations of the present disclosure.
Figure 15:
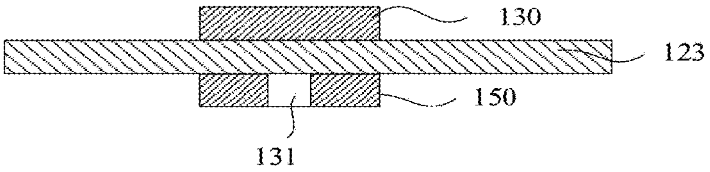
FIG. 15 is a cross-sectional view of the antenna module in FIG. 13, taken along line III-III.

Reference can be made to FIG. 13, FIG. 14, and FIG. 15 together, where FIG. 13 is a top view illustrating an antenna module in other implementations of the present disclosure, FIG. 14 is a perspective view illustrating an antenna module in other implementations of the present disclosure, and FIG. 15 is a cross-sectional view of the antenna module in FIG. 13, taken along line III-III. FIG. 13 to FIG. 15 are only used to illustrate a size relationship between the first antenna radiator 130 and the second antenna radiator 150, other components of the antenna module 10 such as the second antenna radiator 150, the second parasitic radiator 160, etc., are omitted, and an example that the first antenna radiator 130 is spaced apart from the second antenna radiator 150 only through one insulating layer 123 is taken for illustration. It can be understood that in other implementations, other layer structures may be disposed between the first antenna radiator 130 and the second antenna radiator 150, as long as the first antenna radiator 130 is spaced apart from the second antenna radiator 150. The second antenna radiator 150 illustrated in FIG. 14 is illustrated at the same viewing angle as the first antenna radiator 130 illustrated in FIG. 13. In this implementation, the frequency band of the first RF signal is higher than the frequency band of the second RF signal, the first antenna radiator 130 is a conductive patch, the second antenna radiator 150 is a conductive patch, and the second antenna radiator 150 defines a first hollow structure 131 penetrating through two opposite surfaces of the second antenna radiator 150, a size of an outer contour of the first antenna radiator 130 is greater than or equal to a size of an outer contour of the second antenna radiator 150, and a difference between the size of the first antenna radiator 130 and the size of the second antenna radiator 150 is larger with increasing of an area of the first hollow structure 131. In the schematic view of this implementation, an example that the size of the outer contour of the first antenna radiator 130 is equal to the size of the outer contour of the second antenna radiator 150 is taken for illustration.

For radiating RF signals in the same frequency band, in this implementation, compared to the second antenna radiator 150 without the first hollow structure 131, the size of the outer contour of the second antenna radiator 150 with the first hollow structure 131 is less than a size of an outer contour of the second antenna radiator 150 without the first hollow structure 131, which is beneficial to the miniaturization of the antenna module 10.

Figure 16:
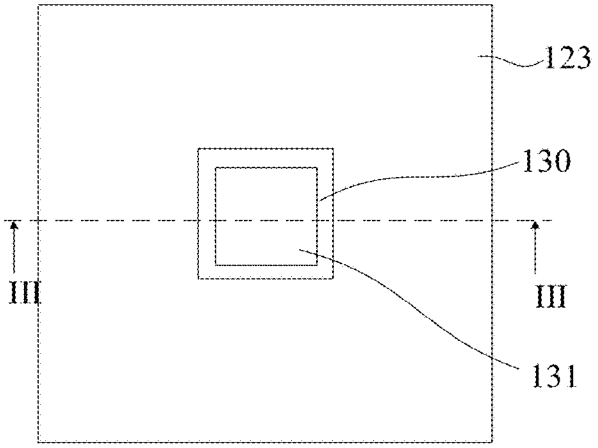
FIG. 16 is a top view illustrating an antenna module in other implementations of the present disclosure.
Figure 17:
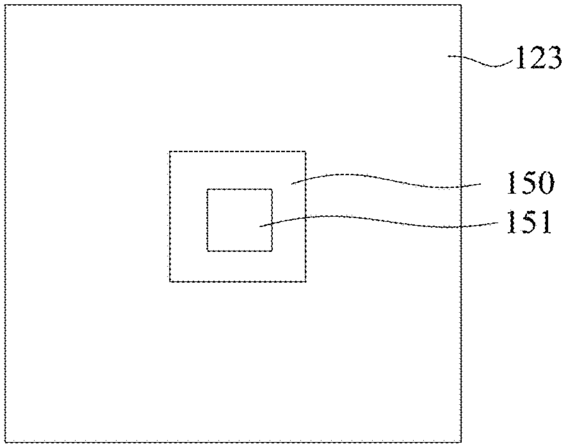
FIG. 17 is a perspective view illustrating an antenna module in other implementations of the present disclosure.
Figure 18:
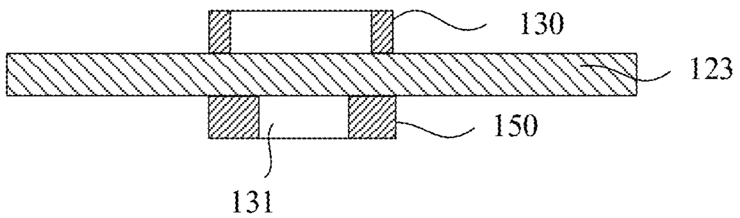
FIG. 18 is a cross-sectional view of the antenna module in FIG. 16, taken along line III-III.

Reference can be made to FIG. 16, FIG. 17, and FIG. 18 together, where FIG. 16 is a top view illustrating an antenna module in other implementations of the present disclosure, FIG. 17 is a perspective view illustrating an antenna module in other implementations of the present disclosure, and FIG. 18 is a cross-sectional view of the antenna module in FIG. 16, taken along line III-III. FIG. 16 to FIG. 18 are only used to illustrate a size relationship between the first antenna radiator 130 and the second antenna radiator 150, other components of the antenna module 10 such as the second antenna radiator 150, the second parasitic radiator 160, etc., are omitted, and an example that the first antenna radiator 130 is spaced apart from the second antenna radiator 150 only through one insulating layer 123 is taken for illustration. It can be understood that in other implementations, other layer structures may be disposed between the first antenna radiator 130 and the second antenna radiator 150, as long as the first antenna radiator 130 is spaced apart from the second antenna radiator 150. The second antenna radiator 150 illustrated in FIG. 17 is illustrated at the same viewing angle as the first antenna radiator 130 illustrated in FIG. 16.

In an implementation, the frequency band of the first RF signal is higher than the frequency band of the second RF signal, the first antenna radiator 130 is a conductive patch, and the first antenna radiator 130 defines a first hollow structure 131 penetrating through two opposite surfaces of the first antenna radiator 130. The second antenna radiator 150 is a conductive patch, and the second antenna radiator 150 defines a second hollow structure 151 penetrating through two opposite surfaces of the second antenna radiator 150. A size of an outer contour of the first antenna radiator 130 is less than or equal to a size of an outer contour of the second antenna radiator 150, and an area of the first hollow structure 131 is greater than an area of the second hollow structure 151.

For radiating RF signals in the same frequency band, in this implementation, compared to the first antenna radiator 130 without the first hollow structure 131, the size of the outer contour of the first antenna radiator 130 with the first hollow structure 131 is less than a size of an outer contour of the first antenna radiator 130 without the first hollow structure 131, which is beneficial to the miniaturization of the antenna module 10. Furthermore, for radiating RF signals in the same frequency band, in this implementation, compared to the second antenna radiator 150 without the second hollow structure 151, the size of the outer contour of the second antenna radiator 150 with the second hollow structure 151 is less than a size of an outer contour of the second antenna radiator 150 without the second hollow structure 151, which is further beneficial to the miniaturization of the antenna module 10.

Figure 19:
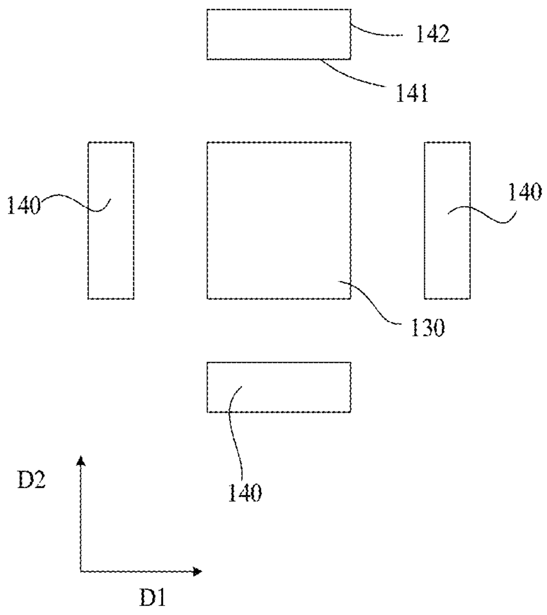
FIG. 19 is a top view illustrating a first parasitic radiator and a first antenna radiator provided in implementations of the present disclosure.

Reference can be made to FIG. 19, which is a top view illustrating a first parasitic radiator and a first antenna radiator provided in implementations of the present disclosure. Optionally, the first parasitic radiator 140 is a rectangular conductive patch, and the first parasitic radiator 140 has a first edge 141 close to the first antenna radiator 130 and a second edge 142 connected with the first edge 141. The length of the first edge 141 is greater than the length of the second edge 142, the first edge 141 is configured to adjust a resonant frequency of the first parasitic radiator 140, and the second edge 142 is configured to adjust an impedance matching degree between the first parasitic radiator 140 and the first antenna radiator 130. In other words, the resonant frequency of the first parasitic radiator 140 can be adjusted by changing the length of the first edge 141, and the impedance matching degree between the first parasitic radiator 140 and the first antenna radiator 130 can be adjusted by changing the length of the second edge 142.

Specifically, different lengths of the first edge 141 lead to different resonant frequencies of the first parasitic radiator 140, and different lengths of the second edge 142 lead to different impedance matching degrees between the first parasitic radiator 140 and the first antenna radiator 130. Generally, the lengths of the second edge 142 and the impedance matching degrees between the first parasitic radiator 140 and the first antenna radiator 130 present a normal distribution relationship. In other words, for a RF signal of a preset frequency band, when the length of the second edge 142 is a preset length, the impedance matching degree between the first parasitic radiator 140 and the first antenna radiator 130 is optimal; when the length of the second edge 142 is less than or greater than the preset length, the impedance matching degree between the first parasitic radiator 140 and the first antenna radiator 130 decreases.

In addition, a distance between the first parasitic radiator 140 and the first antenna radiator 130 may also affect a coupling degree between the first parasitic radiator 140 and the first antenna radiator 130. When the distance between the first parasitic radiator 140 and the first antenna radiator 130 is greater, the coupling degree between the first parasitic radiator 140 and the first antenna radiator 130 is less. Conversely, when the distance between the first parasitic radiator 140 and the first antenna radiator 130 is less, the coupling degree between the first parasitic radiator 140 and the first antenna radiator 130 is greater. When the coupling degree between the first parasitic radiator 140 and the first antenna radiator 130 is greater, strength of the first RF signal radiated by the first parasitic radiator 140 is greater, such that the communication performance of the antenna module 10 is better.

Figure 21:
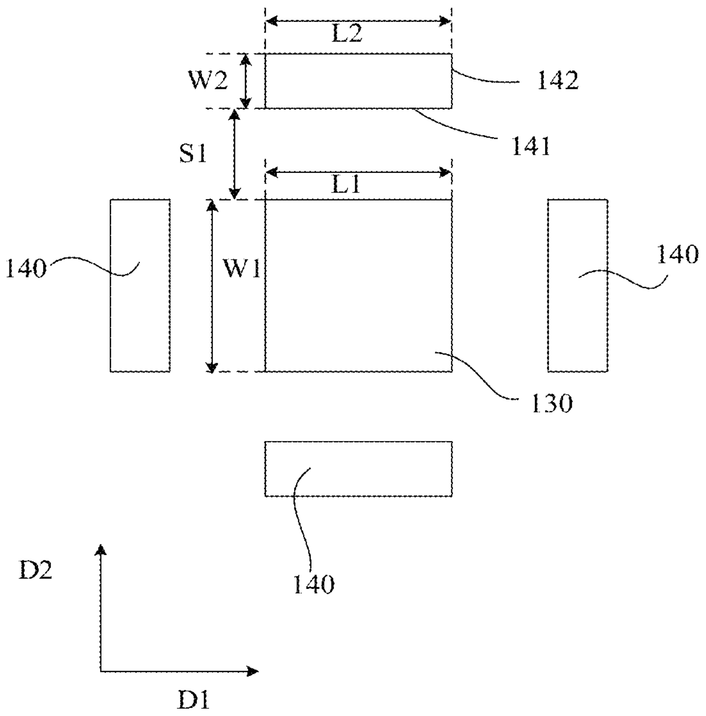
FIG. 21 is a schematic sized view illustrating a first antenna radiator and a first parasitic radiator provided in implementations of the present disclosure.

Reference can be made to FIG. 21, which is a schematic sized view illustrating a first antenna radiator and a first parasitic radiator provided in implementations of the present disclosure. The size of the first antenna radiator 130 and the size of the first parasitic radiator 140 are described below with reference to FIG. 21.

Selection of the size of the first antenna radiator 130, the size of the second antenna radiator 150, and the distance between the first parasitic radiator 140 and the first antenna radiator 130 is not arbitrary, but considers the frequency band of the first RF signal radiated by the first parasitic radiator 140 and the first antenna radiator 130 and the bandwidth of the first RF signal, and is obtained by strict design and adjustment. Design and adjustment processes are described as follows.

The first antenna radiator 130 and the first parasitic radiator 140 of the antenna module 10 are usually carried on the substrate 120, and a relative dielectric constant $\varepsilon_r$ of the substrate 120 is usually 3.4. A distance between the first antenna radiator 130 and a ground layer in the substrate 120 is 0.4 mm, therefore, the width w of the first antenna radiator 130 of the antenna module 10 can be calculated by formula (1):

$$w = \frac{c}{2f\sqrt{\frac{(\varepsilon_r + 1)}{2}}},$$

where c represents the light speed, f represents a resonant frequency of the first antenna radiator 130, $\varepsilon_r$ is a relative dielectric constant of a medium between the first antenna radiator 130 and the ground layer in the antenna module 10. The antenna module 10 introduced previously is taken as an example, and the medium between the first antenna radiator 130 and the ground layer in the antenna module 10 is a core layer and each insulating layer which are between the first antenna radiator 130 and the ground layer.

The length of the first antenna radiator 130 is generally taken as $$\frac{\lambda}{2},$$

but due to the edge effect, an actual size L of the first antenna radiator 130 is usually greater than $$\frac{\lambda}{2}.$$

The actual length L of the first antenna radiator 130 can be calculated by formula (2):

$$L = \frac{c}{2f\sqrt{\varepsilon_e}} - 2\Delta L$$

and formula (3):

$$\lambda = \frac{\lambda_0}{\sqrt{\varepsilon_r}},$$

where λ represents a wavelength of a guided wave in the medium, $\lambda_0$ represents a wavelength in free space, $\varepsilon_e$ represents an effective dielectric constant, and ΔL represents a width of an equivalent radiation gap.

The effective dielectric constant $\varepsilon_e$ can be calculated by formula (4):

$$\varepsilon_e = \frac{\varepsilon_r + 1}{2} + \frac{\varepsilon_r - 1}{2}\left(1 + 12\frac{h}{w}\right)^{-\frac{1}{2}},$$

where $h$ represents the distance between the first antenna radiator 130 and the ground layer.

The width ΔL of the equivalent radiation gap can be calculated by formula (5):

$$\Delta L = 0.412\frac{(\varepsilon_r + 0.3)(\frac{w}{h} + 0.264)}{(\varepsilon_r - 0.258)(\frac{w}{h} + 0.8)}h.$$

The resonant frequency of the first antenna radiator 130 can be calculated by formula (6):

$$f = \frac{1}{2(L + 2\Delta L)\sqrt{\mu_0 \varepsilon_0}\sqrt{\varepsilon_r}}.$$

For example, the resonant frequency of the first antenna radiator 130 is 39 GHz, the length and the width of the first antenna radiator 130 are calculated according to formulas (1)-(6). The distance between the first antenna radiator 130 and the first parasitic radiator 140, the distance between the first antenna radiator 130 and the ground layer, and the length and the width of the first parasitic radiator 140 are preset, modeling and analyzing are performed according to the above parameters, a radiation boundary and a radiation port of the antenna module 10 are set, and a variation curve of a return loss with a frequency is obtained by frequency sweep.

The bandwidth of the first RF signal radiated by the first antenna radiator 130 is further optimized according to an obtained variation curve of the return loss with the frequency. A length L1 and a width W1 of the first antenna radiator 130, a horizontal distance S1 between the first antenna radiator 130 and the first parasitic radiator 140, a distance h1 between the first antenna radiator 130 and the ground layer (reference can be made to FIG. 8), and a length L2 of the first parasitic radiator 140 are further adjusted, to optimize the variation curve of the return loss with the frequency. Reference can be made to optimized variation curves of the return losses with the frequencies in FIG. 20, and the first RF signal with a bandwidth of 37~41 GHz is further obtained. In other words, the first RF signal includes frequency band n260.

Based on an adjustment process of the length L1 and the width W1 of the first antenna radiator 130, the horizontal distance S1 between the first antenna radiator 130 and the first parasitic radiator 140, the distance h1 between the first antenna radiator 130 and the ground layer, and the length L2 of the first parasitic radiator 140, a range of the length L1 and a range of the width W1 of the first antenna radiator 130, a range of the horizontal distance S1 between the first antenna radiator 130 and the first parasitic radiator 140, a range of the distance h1 between the first antenna radiator 130 and the ground layer, and a range of the length L2 of the first parasitic radiator 140 can be obtained.

Reference can be made to FIG. 21 again, the first antenna radiator 130 is a rectangular patch array, each of a size of the first antenna radiator 130 in a first direction D1 and a size of the first antenna radiator 130 in a second direction D2 is less than or equal to 2 mm. The size of the first antenna radiator 130 in the first direction D1 is the length L1 of the first antenna radiator 130, and the size of the first antenna radiator 130 in the second direction D2 is the width W1 of the first antenna radiator 130. In other words, the length L1 of the first antenna radiator 130 ranges from 0~2.0 mm, and the width W1 of the first antenna radiator 130 ranges from 0~2.0 mm. Furthermore, the length L1 of the first antenna radiator 130 ranges from 1.6~2.0 mm, and the width W1 of the first antenna radiator 130 ranges from 1.6~2.0 mm, such that the bandwidth of the first RF signal radiated by the first antenna radiator 130 and the first parasitic radiator 140 ranges from 37~41 GHz. Generally, for the first antenna radiator 130 with a certain width, the greater the length L1 of the first antenna radiator 130, the more the resonant frequency of the first RF signal shifts towards a low frequency; for the first antenna radiator 130 with a certain width, the smaller the length L1 of the first antenna radiator 130, the more the resonant frequency of the first RF signal shifts towards a high frequency.

Reference can be made to FIG. 21, the length L2 of the first parasitic radiator 140 is equal to the length L1 of the first antenna radiator 130, a width W2 of the first parasitic radiator 140 ranges from 0.2~0.9 mm, and the horizontal distance S1 between the first antenna radiator 130 and the first parasitic radiator 140 ranges from 0.2~0.8 mm. The horizontal distance S1 between the first antenna radiator 130 and the first parasitic radiator 140 means a distance between projections of two adjacent sides of the first antenna radiator 130 and the first parasitic radiator 140 (that is, a length side of first antenna radiator 130 and a length side of the first parasitic radiator 140 which is close to the length side of first antenna radiator 130) on a plane where the first antenna radiator 130 or the first parasitic radiator 140 is located. The first antenna radiator 130 is configured to excite the first RF signal between the first antenna radiator 130 and the ground layer, and radiate the first RF signal outward though a gap defined between the first antenna radiator 130 and the ground layer, and the first parasitic radiator 140 is coupled with the first RF signal radiated by the first antenna radiator 130, to radiate the first RF signal. A too large or a too small horizontal distance S1 between the first antenna radiator 130 and the first parasitic radiator 140 each cannot realize effective coupling. When the horizontal distance S1 between the first antenna radiator 130 and the first parasitic radiator 140 ranges from 0.2~0.8 mm, the coupling effect between the first antenna radiator 130 and the first parasitic radiator 140 is relatively great, and the first RF signal has a relatively large bandwidth.

Reference can be made to FIG. 8, and the distance h1 between the first antenna radiator 130 and the ground layer is less than or equal to 0.9 mm. A distance h2 between the second antenna radiator 150 and the ground layer ranges from 0.3~0.6 mm.

Specifically, the distance h2 between the second antenna radiator 150 and the ground layer is the thickness of the insulating layer in the substrate 120. When the thickness of the insulating layer in the substrate 120 is too small, it is easy to cause the antenna module 10 to warp during molding. When the thickness of the insulating layer in the substrate 120 is too large, it is not beneficial to thinness of antenna module 10. Therefore, comprehensively considered, the distance h2 between the second antenna radiator 150 and the ground layer is designed to range from 0.3~0.6 mm, which can meet requirements for both thinness and non-warping of the antenna module 10.

In order to obtain a required frequency bandwidth, the distance h1 between the first antenna radiator 130 and the ground layer can be adjusted appropriately. Generally, the distance h1 between the first antenna radiator 130 and the ground layer is in direct proportion to a frequency bandwidth. In other words, when the distance h1 between the first antenna radiator 130 and the ground layer is larger, the frequency bandwidth of the first RF signal radiated by the first antenna radiator 130 is larger; conversely, when the distance h1 between the first antenna radiator 130 and the ground layer is smaller, the frequency bandwidth of the first RF signal radiated by the first antenna radiator 130 is smaller. Specifically, when the distance h1 between the first antenna radiator 130 and the ground layer is increased, energy radiated by first antenna radiator 130 can be increased, that is, the frequency bandwidth of the first RF signal radiated by the first antenna radiator 130 is increased. However, an increase of the distance h1 between the first antenna radiator 130 and the ground layer will excite more surface waves, and the surface waves will reduce radiation of the first RF signal in a required direction and change a directional characteristic of the radiation of the first antenna radiator 130. Therefore, after the frequency bandwidth of the first RF signal and a directivity of the first RF signal are considered, the distance h1 between the first antenna radiator 130 and the ground layer is selected to be less than or equal to 0.9 mm.

Figure 20:
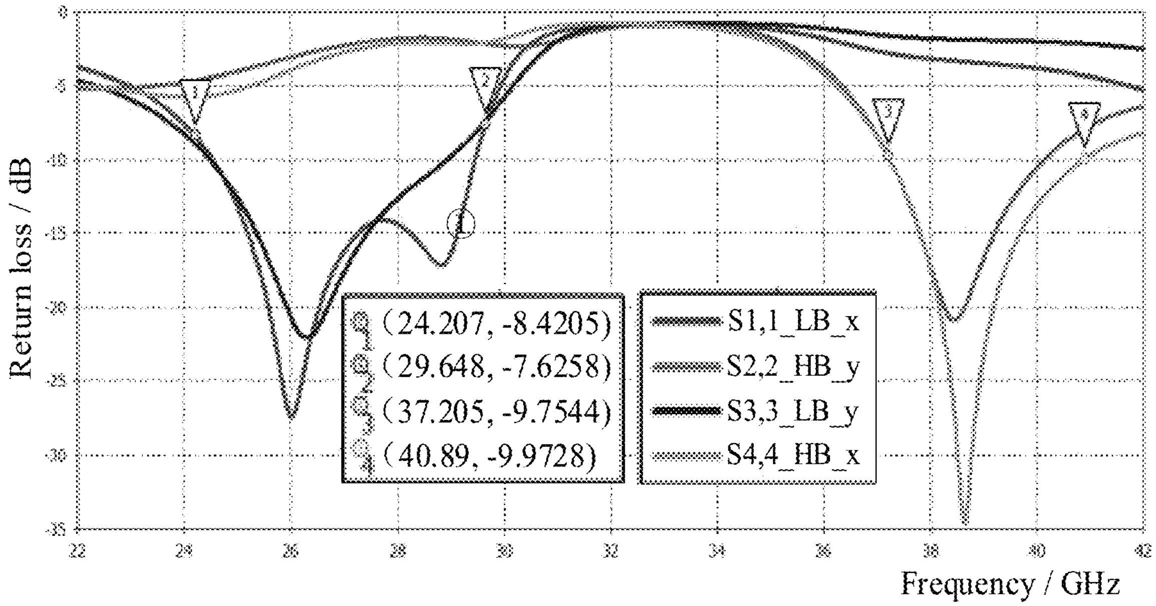
FIG. 20 illustrates optimized variation curves of return losses with frequencies.

According to a relationship between the size of the first antenna radiator 130 and a frequency, a relationship between the size of the first parasitic radiator 140 and a frequency, and a relationship between the distance between the first antenna radiator 130 and the first parasitic radiator 140 and a frequency, the size of the first antenna radiator 130, the size of the first parasitic radiator 140, and the distance between the first antenna radiator 130 and the first parasitic radiator 140 are adjusted, to optimize the variation curve of the return loss with the frequency. Reference can be made to variation curves of optimized return losses with frequencies in FIG. 20, and a first RF signal with a frequency band of 37~41 GHz is further obtained. In FIG. 20, the abscissa represents the frequency in units of GHz, the ordinate represents the return loss in units of decibel (dB), and curve ① represents the variation curve of the return loss with the frequency. Frequencies corresponding to gains less than or equal to −10 dB belong to a frequency band of operation of the antenna module 10. It can be seen from curve ① that the frequency band of the first RF signal is from 37 to 41 GHz.

Similar to the first antenna radiator 130, a center frequency of the second RF signal radiated by the second antenna radiator 150 and a center frequency of the second RF signal radiated by the second parasitic radiator 160 are 26 GHz and 28 GHz respectively. By designing the size of the second antenna radiator 150, the distance between the second antenna radiator 150 and the second parasitic radiator 160, the distance between the second antenna radiator 150 and the ground layer, the size of the second parasitic radiator 160, and the distance between the second parasitic radiator 160 and the ground layer, the bandwidth of the second RF signal is broadened to obtain a RF signal with a frequency band of 23.9~29.9 GHz. Specific implementations of regulation and control are as follows. Formulas (1)-(6) can be directly used for the second antenna radiator 150, and formulas (1)-(6) will not be repeated here.

A relative dielectric constant $\varepsilon_r$ of the insulating layer in the substrate 120 is determined to be 3.4, and the distance h2 between the second antenna radiator 150 and the ground layer is 0.5 mm. According to a resonant frequency of the second antenna radiator 150 to be designed being 39 GHz and formulas (1)-(6), a length L3 and a width W3 of the second antenna radiator 150 can be calculated. A horizontal distance S2 and a vertical distance h3 between the second antenna radiator 150 and the second parasitic radiator 160, the distance h2 between the second antenna radiator 150 and the ground layer, and a length L4 and a width W4 of the second parasitic radiator 160 are preset. Modeling and analyzing are performed according to the above parameters, a radiation boundary, a boundary condition, and a radiation port are set, and a variation curve of a return loss with a frequency is obtained by frequency sweep.

According to the above variation curve of the return loss with the frequency, the bandwidth of the second RF signal radiated by the second antenna radiator 150 is further optimized. The length L3 and the width W3 of the second antenna radiator 150, the horizontal distance S2 and the vertical distance h3 between the second antenna radiator 150 and the second parasitic radiator 160, the distance h2 between the second antenna radiator 150 and the ground layer, and the length L4 of the second parasitic radiator 160 are further adjusted, to optimize the variation curve of the return loss with the frequency. Reference can be made to the optimized variation curves of the return losses with the frequencies in FIG. 20, and the second RF signal with a bandwidth of 23.9~29.9 GHz is further obtained.

The same as an adjustment method of the first antenna radiator 130, based on the above adjustment process of the length L3 and the width W3 of the second antenna radiator 150, the horizontal distance S2 and the vertical distance h3 between the second antenna radiator 150 and the second parasitic radiator 160, the distance h2 between the second antenna radiator 150 and the ground layer, and the length L4 of the second parasitic radiator 160, a range of the length L3 and the width W3 of the second antenna radiator 150, a range of the horizontal distance S2 and a range of the vertical distance h3 between the second antenna radiator 150 and the second parasitic radiator 160, a range of the distance h2 between the second antenna radiator 150 and the ground layer, and a range of the length L4 of the second parasitic radiator 160 can be obtained.

Figure 22:
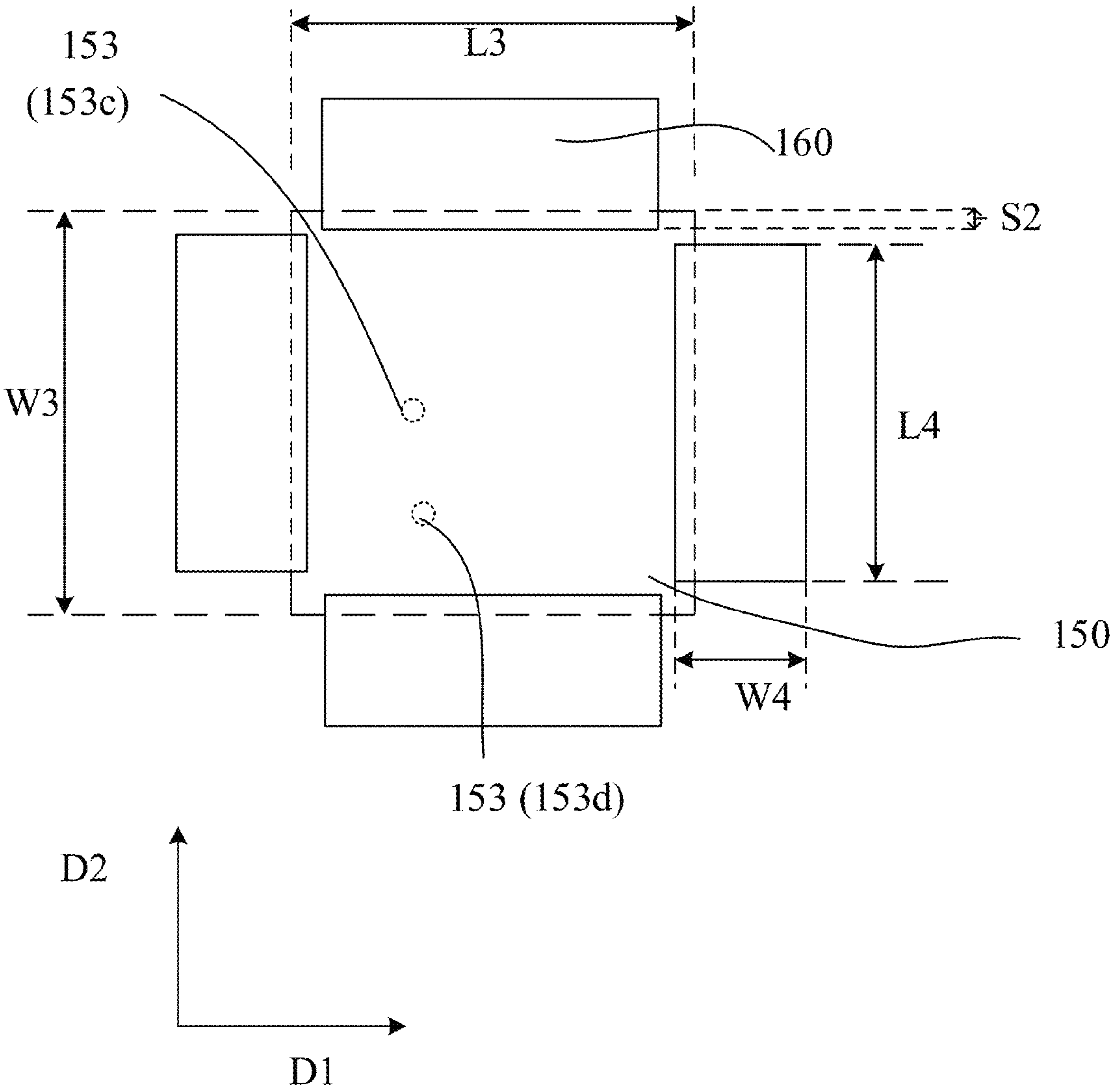
FIG. 22 is a perspective view illustrating a second antenna radiator and a second parasitic radiator.

Reference can be made to FIG. 22, which is a perspective view illustrating a second antenna radiator and a second parasitic radiator. In this implementation, only the second antenna radiator 150 and the second parasitic radiator 160 of the antenna module 10 are illustrated, while other components are omitted. The second antenna radiator 150 is a rectangular conductive patch, a size of the second antenna radiator 150 in the first direction D1 ranges from 2.0~2.8 mm, and the size of the second antenna radiator 150 in the first direction D1 is the length of the second antenna radiator 150, which is denoted as L3, in other words, the length L3 of the second antenna radiator 150 ranges from 2.0~2.8 mm. A size of the second antenna radiator 150 in the second direction D2 also ranges from 2.0~2.8 mm. The size of the second antenna radiator 150 in the second direction D2 is the width of the second antenna radiator 150, which is denoted as W3, in other words, the width W3 of the second antenna radiator 150 ranges from 2.0~2.8, such that the bandwidth of the second RF signal radiated by the second antenna radiator 150 and the second parasitic radiator 160 ranges from 23.9~29.9 GHz. Generally, when the length L3 of the second antenna radiator 150 is greater, the resonant frequency of the second RF signal shifts towards a lower frequency.

Furthermore, reference can be made to FIG. 22, the second antenna radiator 150 is a rectangular conductive patch, the second parasitic radiator 160 is a rectangular conductive patch, and an absolute value of a difference between the length L3 of the second antenna radiator 150 and the length L4 of the second parasitic radiator 160 is less than or equal to 0.8 mm. The length of a short edge of the second parasitic radiator 160 ranges from 0.2~0.9 mm, in other words, the width W4 of the second parasitic radiator 160 ranges from 0.2~0.9 mm. When the second parasitic radiator 160 is stacked with the second antenna radiator 150, the distance h3 (reference can be made to FIG. 8) from the second parasitic radiator 160 to the second antenna radiator 150 ranges from 0~0.6 mm.

Reference can be made to FIG. 22, the absolute value of the difference between the length L3 of the second antenna radiator 150 and the length L4 of the second parasitic radiator 160 is less than or equal to 0.8 mm. Specifically, the length L3 of the second antenna radiator 150 may be greater than, equal to, or less than the length L4 of the second parasitic radiator 160, as long as the absolute value of the difference between the length L3 of the second antenna radiator 150 and the length L4 of the second parasitic radiator 160 is less than or equal to 0.8 mm. Structures of the second antenna radiator 150 and the second parasitic radiator 160 can make the first antenna radiator 130 and the first parasitic radiator 140 resonate at different frequency points, such that the antenna module 10 has a relatively large bandwidth.

Reference can be made to FIG. 22 again, the second antenna radiator 150 includes at least two second feeding points 153, and in the schematic view of this implementation, an example that the second antenna radiator 150 includes two second feeding points 153 is taken for illustration. When the second antenna radiator 150 includes the two second feeding points 153, the two second feed points 153 are respectively named a second feeding point 153*c* and a second feeding point 153*d* for convenience of distinction. When the second excitation signal is loaded on the second antenna radiator 150 through the second feeding point 153*c*, the second antenna radiator 150 generates a second RF signal, and a polarization direction of the second RF signal is a third polarization direction; when the second excitation signal is loaded on the second antenna radiator 150 through the second feeding point 153*d*, the second antenna radiator 150 generates a second RF signal, and a polarization direction of the second RF signal is a fourth polarization direction, where the third polarization direction is different from the fourth polarization direction. It can be seen that the second antenna radiator 150 in this implementation can realize the dual polarization. When the second antenna radiator 150 can realize the dual polarization, the communication effect of the antenna module 10 can be improved. In addition, compared to a traditional technique in which two antennas are used to realize different polarization, the number of antennas in the antenna module 10 can be reduced in this implementation.

Reference can be made to FIG. 8 together, the vertical distance h3 between the second parasitic radiator 160 and the second antenna radiator 150 ranges from 0~0.6 mm, in other words, the vertical distance h3 between a plane where the second parasitic radiator 160 is located and a plane where the second antenna radiator 150 is located ranges from 0~0.6 mm. The second antenna radiator 150 is configured to excite the second RF signal between the second antenna radiator 150 and the ground layer, and radiate the second RF signal outward through a gap defined between the second antenna radiator 150 and the ground layer, and the second parasitic radiator 160 is coupled with the second RF signal radiated by the second antenna radiator 150, to radiate the second RF signal. A too large or a too small vertical distance between the second parasitic radiator 160 and the second antenna radiator 150 each cannot realize effective coupling. When the vertical distance h3 between the second parasitic radiator 160 and the second antenna radiator 150 ranges from 0~0.6 mm, the coupling effect between the second parasitic radiator 160 and the second antenna radiator 150 is relatively great.

Reference can be made to FIG. 8, furthermore, the vertical distance h3 between the second parasitic radiator 160 and the second antenna radiator 150 ranges from 0.05~0.6 mm, such that the vertical distance h3 between the second parasitic radiator 160 and the second antenna radiator 150 has a relatively large adjustable range, thereby realizing a relatively large bandwidth of the second RF signal.

Furthermore, the above structure design of the second antenna radiator 150 and the second parasitic radiator 160 can make the second antenna radiator 150 resonate at the third frequency point and the second parasitic radiator 160 resonate at the fourth frequency point, where the third frequency point is different from the fourth frequency point. On condition that the bandwidth of the second RF signal radiated by the second antenna radiator 150 is certain and the bandwidth of the second RF signal radiated by the second parasitic radiator 160 is certain, compared to a condition where the resonant frequency point of the second parasitic radiator 160 is the same as the resonant frequency point of the second antenna radiator 150, that the resonant frequency point of the second parasitic radiator 160 is different from the resonant frequency point of the second antenna radiator 150 can increase the bandwidth of the second RF signal.

For example, the frequency band of the RF signal generated by the second antenna radiator 150 is a 28 GHz frequency band, the second antenna radiator 150 is configured to resonate at the third frequency point in the 28 GHz frequency band, and the second parasitic radiator 160 is configured to resonate at the fourth frequency point in the 28 GHz frequency band. By adjusting the size of the second antenna radiator 150, the size of the second parasitic radiator 160, and the distance between the second antenna radiator 150 and the second parasitic radiator 160, the impedance bandwidth of the 28 GHz frequency band can be optimized, and the bandwidth of the 28 GHz frequency band can be further expanded, such that the frequency band of the second RF signal generated by the second antenna radiator 150 and the second parasitic radiator 160 can range from 24.25~29.5 GHz, which satisfies frequency band n257, frequency band n258, and frequency band n261. It can be understood that the frequency band of the second RF signal generated by the second antenna radiator 150 may be other frequency bands except the 28 GHz frequency band. It can be understood that an example that the frequency band of the second RF signal ranges from 24.25~29.5 GHz is only taken for illustration here, in other implementations, the frequency band of the second RF signal may also be other frequency bands.

The frequency band of the first RF signal and the frequency band of the second RF signal are interchangeable, that is, the frequency band of the first RF signal includes frequency band n260 and the frequency band of the second RF signal includes frequency band n257, frequency band n258, and frequency band n261; or the frequency band of the first RF signal includes frequency band n257, frequency band n258, and frequency band n261 and the frequency band of the second RF signal includes frequency band n260.

The number of the second parasitic radiator 160 may be one, two, or three, etc. The number of the second parasitic radiator 160 can be selected according to a condition of the second antenna radiator 150, and the number of the second parasitic radiator 160 is not limited as long as the second RF signal radiated by the second antenna radiator 150 can be coupled. In this implementation, an example that the number of the second parasitic radiator 160 is four is taken for illustration.

An orthogonal projection of the multiple parasitic radiators 160 on a plane where the second antenna radiator 150 is located is partially coincident with a region where the second antenna radiator 150 is located, such that the second parasitic radiator 160 can be better coupled with the second RF signal radiated by the second antenna radiator 150.

Figure 23:
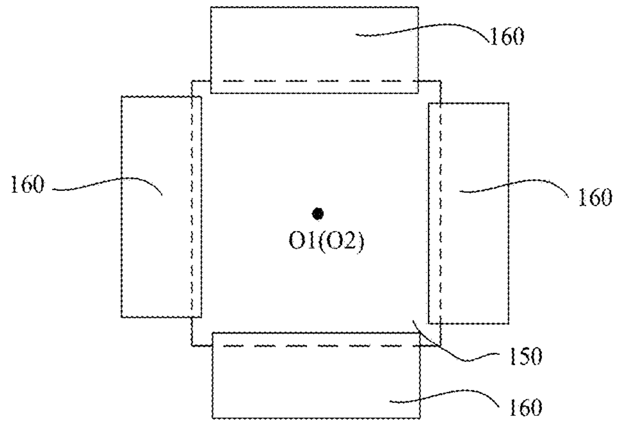
FIG. 23 is a schematic view illustrating a position relationship of a second antenna radiator and a second parasitic radiator.

Furthermore, reference can be made to FIG. 23, which is a schematic view illustrating a position relationship of a second antenna radiator and a second parasitic radiator. A center of the region where the second antenna radiator 150 is located is coincident with a center of the orthogonal projection of the multiple second parasitic radiators 160 on the plane where the second antenna radiator 150 is located.

The center of the region where the second antenna radiator 150 is denoted as a first center O1. It should be noted that the multiple second parasitic radiators 160 are treated as a whole, not individually, where the center of the orthographic projection of the second parasitic radiator 160 on the plane where the second antenna radiator 150 is located means that, the multiple second parasitic radiators 160 are treated as the whole, the center of the orthographic projection of the whole on the plane where the second antenna radiator 150 is located is a second center O2, and the second center O2 is coincident with the first center O1.

Figure 24:
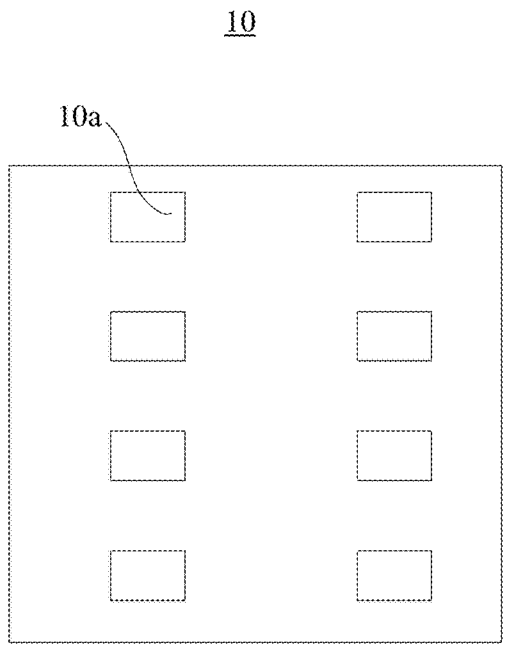
FIG. 24 is a schematic view illustrating an antenna module provided in implementations of the present disclosure.

Reference can be made to FIG. 24, which is a schematic view illustrating an antenna module provided in implementations of the present disclosure. The antenna module 10 includes multiple antenna units 10*a* arranged in an array, for example, the multiple antenna units 10*a* constitute a M×N array to form a phased array antenna. Each antenna unit 10*a* includes the first antenna radiator 130, the first parasitic radiator 140, the second antenna radiator 150, and the second parasitic radiator 160. Reference of relative descriptions of the first antenna radiator 130, the first parasitic radiator 140, the second antenna radiator 150, and the second parasitic radiator 160 can be made to the previous descriptions, which will not be repeated here. Based on the size design of the first antenna radiator 130, the first parasitic radiator 140, the second antenna radiator 150, the second parasitic radiator 160 described above, the width of the antenna unit 10*a* can be less than 4.2 mm and the length of the antenna unit 10*a* can be less than 5 mm, which realizes miniaturization of the antenna unit 10*a*, and further realizes the miniaturization of the antenna module 10. When the antenna module 10 is applicable to an electronic device 1, it is beneficial to thinness design of the electronic device 1.

Figure 25:
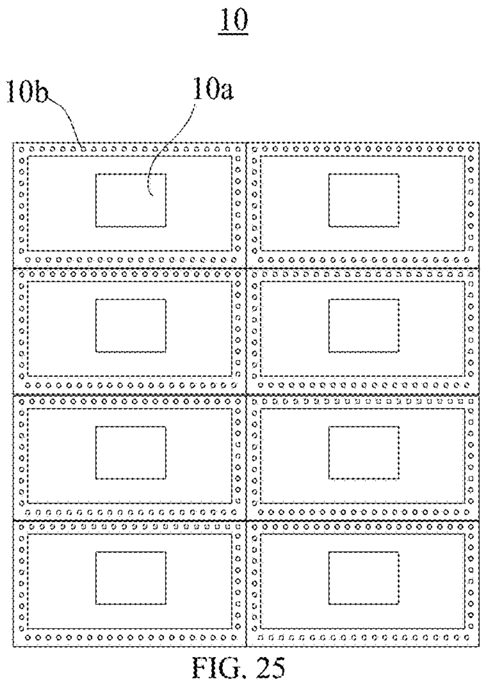
FIG. 25 is a schematic view illustrating an antenna module provided in other implementations of the present disclosure.

Reference can be made to FIG. 25, which is a schematic view illustrating an antenna module provided in other implementations of the present disclosure. The antenna module 10 includes multiple antenna units 10*a* arranged in an array, each antenna unit 10*a* includes the first antenna radiator 130, the first parasitic radiator 140, the second antenna radiator 150, and the second parasitic radiator 160. Reference of the first antenna radiator 130, the first parasitic radiator 140, the second antenna radiator 150, and the second parasitic radiator 160 can be made to the previous descriptions, which will not be repeated here. In this implementation, multiple metallization-via-hole grids 10*b* are defined between adjacent antenna units 10*a*. The metallization-via-hole grid 10*b* is used to isolate interference between adjacent antenna units 10*a*, so as to improve the radiation effect of the antenna module 10.

Figure 26:
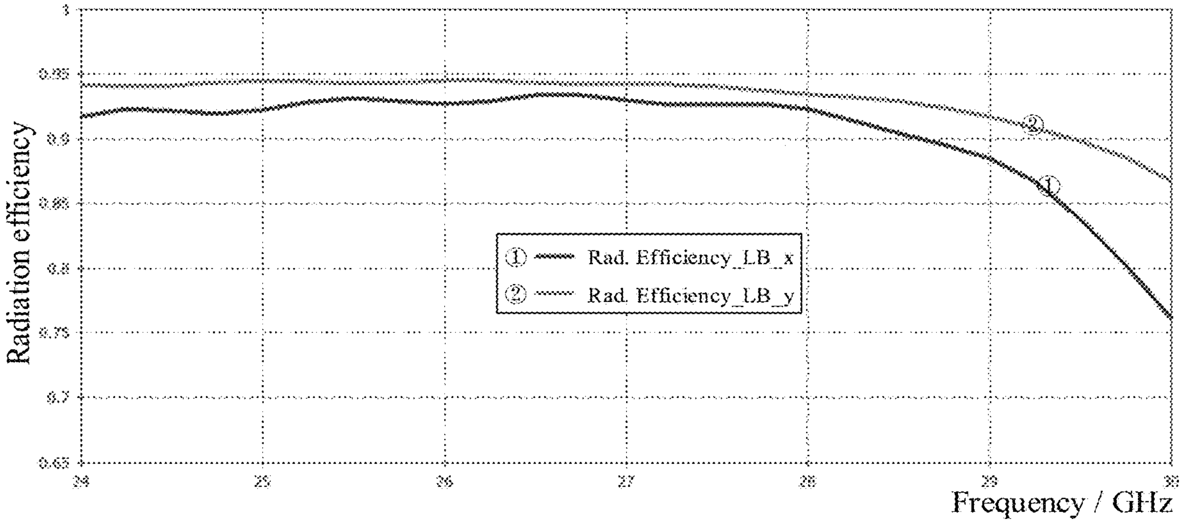
FIG. 26 is a schematic view illustrating radiation efficiency of radiating a radio frequency (RF) signal of 36~41 gigahertz (GHz) by an antenna module in the present disclosure.

The antenna module 10 provided in the present disclosure is simulated below, and reference can be made to FIG. 26, which is a schematic view illustrating radiation efficiency of radiating a RF signal of 36~41 GHz by an antenna module in the present disclosure. In FIG. 26, the abscissa represents the frequency in units of GHz, and the ordinate represents the radiation efficiency without units. In FIG. 26, curve ① represents the radiation efficiency of the RF signal of 36~41 GHz in X direction, and curve ② represents the radiation efficiency of the RF signal of 36~41 GHz in Y direction. It can be seen from curve ① and curve ② that both radiation efficiencies of the RF signal of 36~41 GHz in X direction and Y direction are relatively high and are greater than 0.85. When the frequency band of the first RF signal is frequency band n260 (37~40 GHz), the radiation efficiencies of the first RF signal in X direction and Y direction are also relatively high.

Figure 27:
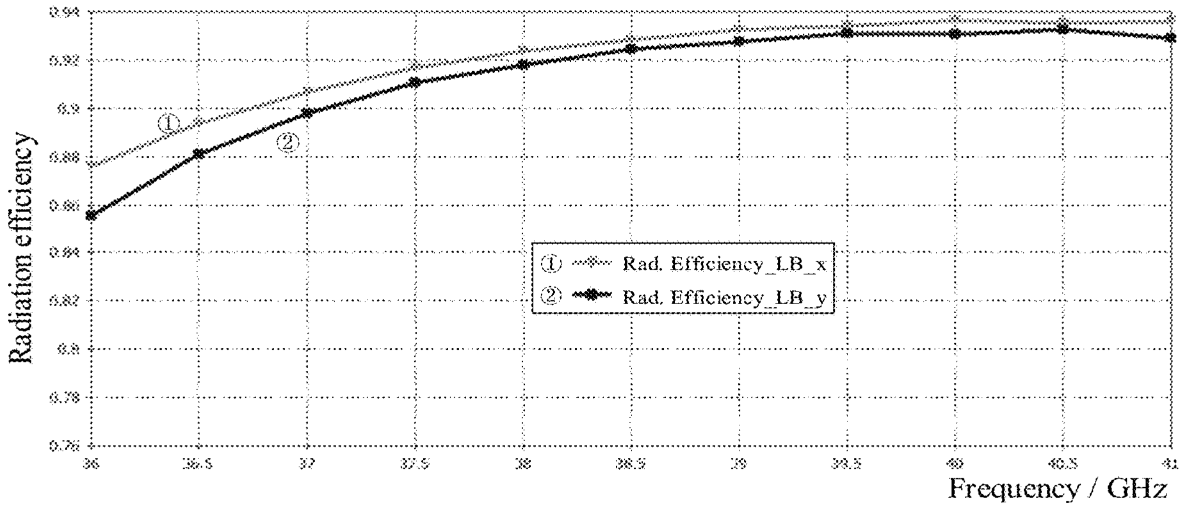
FIG. 27 is a schematic view illustrating radiation efficiency of radiating a RF signal of 24~30 GHz by an antenna module in the present disclosure.

Reference can be made to FIG. 27, which is a schematic view illustrating radiation efficiency of radiating a RF signal of 24~30 GHz by an antenna module in the present disclosure. In FIG. 27, the abscissa represents the frequency in units of GHz, and the ordinate represents the radiation efficiency without units. In FIG. 27, curve ① represents the radiation efficiency of the RF signal of 24~30 GHz in X direction, and curve ② represents the radiation efficiency of the RF signal of 24~30 GHz in Y direction. It can be seen from curve ① and curve ② that both radiation efficiencies of the RF signal of 24~30 GHz in X direction and Y direction are relatively high and are greater than 0.90. When the frequency band of the second RF signal is frequency band n257 (26.5~29.5 GHz), frequency band n258 (24.25~27.5 GHz), and frequency band n261 (27.5~28.35 GHz), the radiation efficiencies of the second RF signal in X direction and Y direction are also relatively high.

Figure 28:
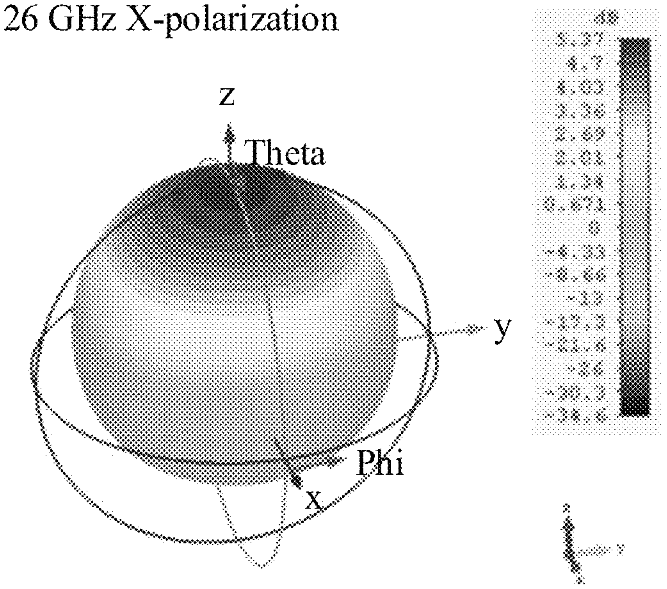
FIG. 28 is a simulation pattern illustrating an antenna module of the present disclosure at 26 GHz and in X-polarization.
Figure 29:
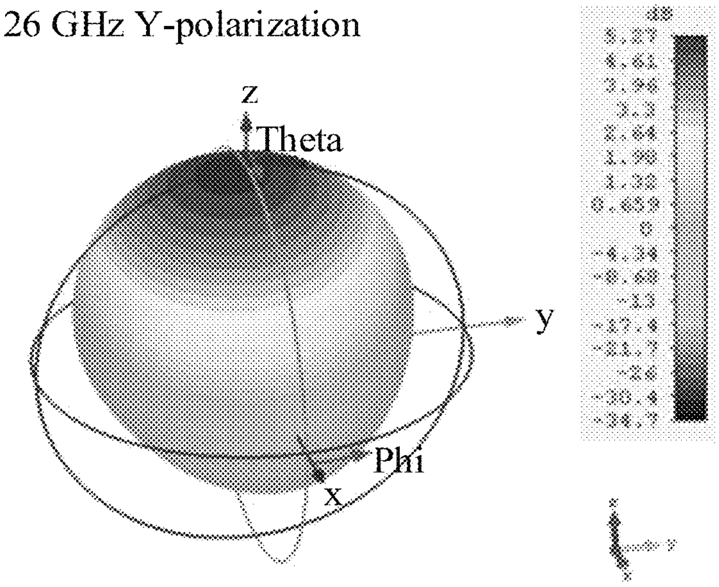
FIG. 29 is a simulation pattern illustrating an antenna module of the present disclosure at 26 GHz and in Y-polarization.

Reference can be made to FIG. 28 and FIG. 29 together. FIG. 28 is a simulation pattern illustrating an antenna module of the present disclosure at 26 GHz and in X-polarization, the maximum value of the gain is 5.37 dB at 26 GHz, which indicates that directivity is relatively great in X direction at 26 GHz. FIG. 29 is a simulation pattern illustrating an antenna module of the present disclosure at 26 GHz and in Y-polarization, in the simulation pattern, the maximum value of the gain is 5.27 dB, which indicated that directivity is relatively great in Y direction at 26 GHz.

Figure 30:
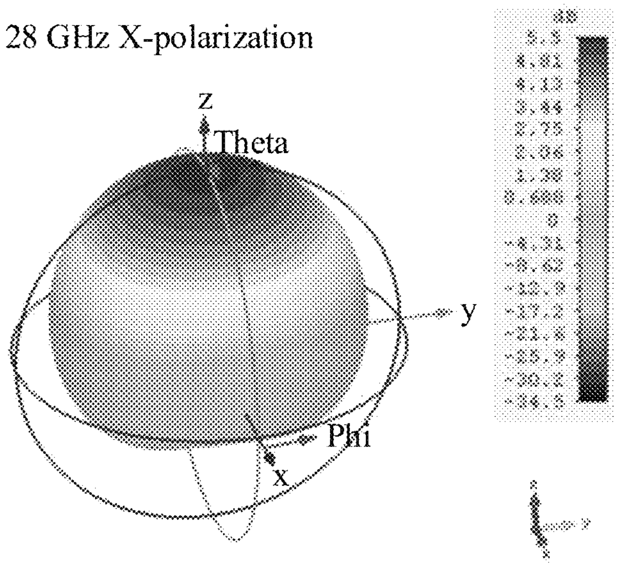
FIG. 30 is a simulation pattern illustrating an antenna module of the present disclosure at 28 GHz and in X-polarization.
Figure 31:
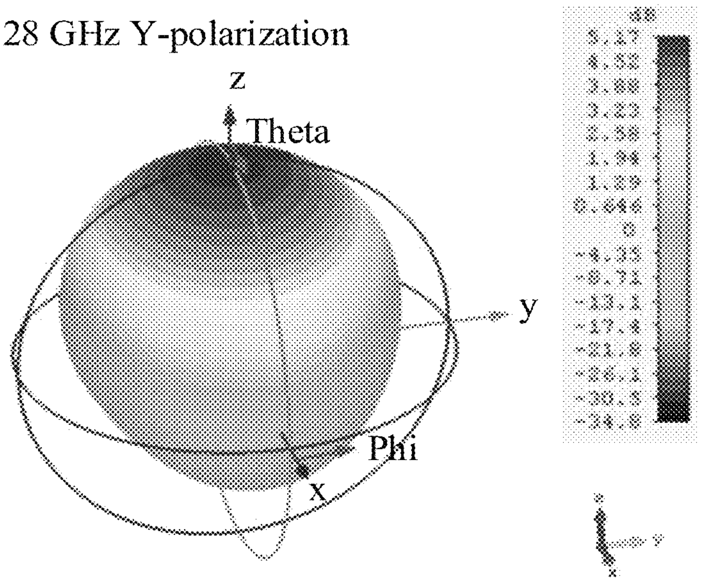
FIG. 31 is a simulation pattern illustrating an antenna module of the present disclosure at 28 GHz and in Y-polarization.

Reference can be made to FIG. 30 and FIG. 31 together. FIG. 30 is a simulation pattern illustrating an antenna module of the present disclosure at 28 GHz and in X-polarization, the maximum value of the gain is 5.5 dB at 28 GHz, which indicates that the directivity is relatively great in X direction at 28 GHz. FIG. 31 is a simulation pattern illustrating an antenna module of the present disclosure at 28 GHz and in Y-polarization, in the simulation pattern, the maximum value of the gain is 5.17 dB, which indicated that the directivity is relatively great in Y direction at 28 GHz.

Figure 32:
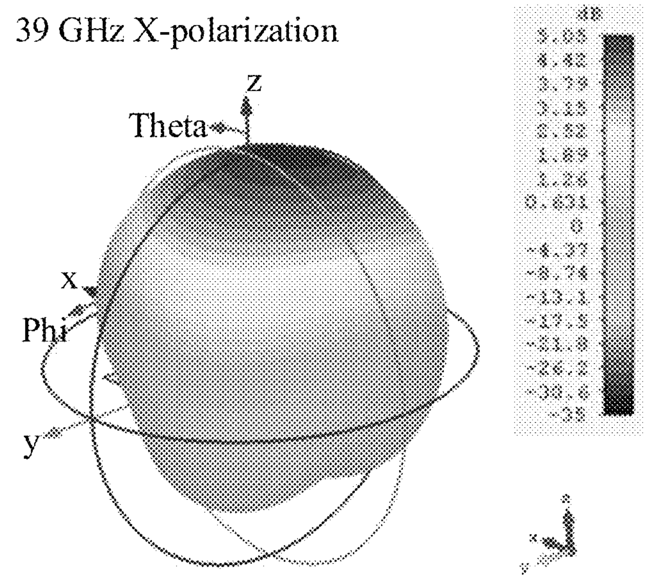
FIG. 32 is a simulation pattern illustrating an antenna module of the present disclosure at 39 GHz and in X-polarization.
Figure 33:
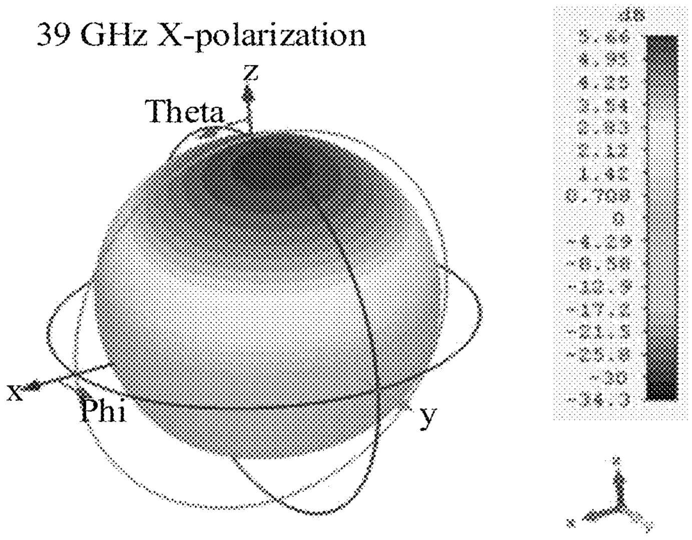
FIG. 33 is a simulation pattern illustrating an antenna module of the present disclosure at 39 GHz and in Y-polarization.

Reference can be made to FIG. 32 and FIG. 33 together. FIG. 32 is a simulation pattern illustrating an antenna module of the present disclosure at 39 GHz and in X-polarization, the maximum value of the gain is 5.05 dB at 39 GHz, which indicates that the directivity is relatively great in X direction at 39 GHz. FIG. 33 is a simulation pattern illustrating an antenna module of the present disclosure at 39 GHz and in Y-polarization, in the simulation pattern, the maximum value of the gain is 5.66 dB, which indicated that the directivity is relatively great in Y direction at 39 GHz.

Figure 34:
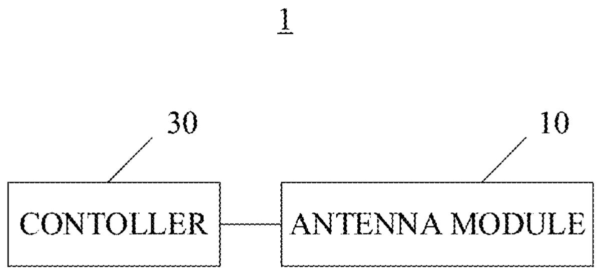
FIG. 34 is a circuit block view illustrating an electronic device provided in implementations of the present disclosure.

Reference can be made to FIG. 34, which is a circuit block view illustrating an electronic device provided in implementations of the present disclosure. An electronic device 1 is further provided in the present disclosure, and the electronic device 1 may be, but is not limited to, a device with a communication function such as a mobile phone, etc. The electronic device 1 includes a controller 30 and the antenna module 10 which is illustrated in any of the above implementations. The controller 30 is electrically connected with the antenna module 10, and the antenna module 10 is configured to operate under control of the controller 30. Specifically, the antenna module 10 is configured to radiate the first RF signal and the second RF signal under control of the controller 30.

Figure 35:
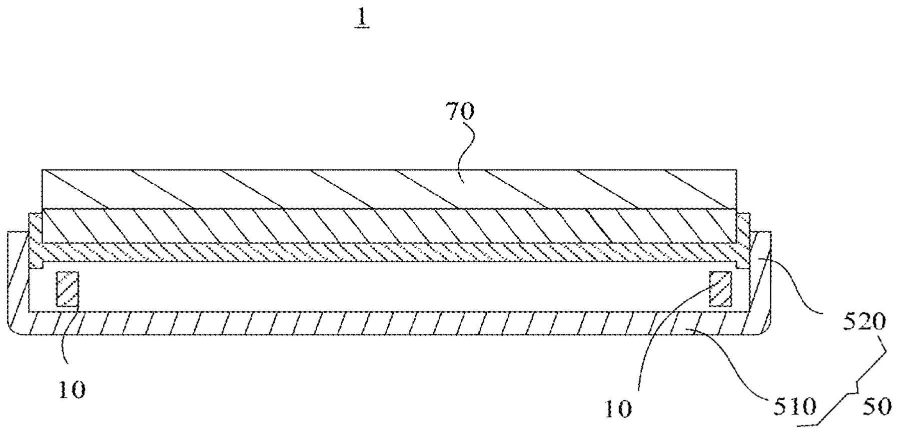
FIG. 35 is a cross-sectional view illustrating an electronic device provided in implementations of the present disclosure.

Reference can be made to FIG. 35, which is a cross-sectional view illustrating an electronic device provided in implementations of the present disclosure. The electronic device 1 includes a battery cover 50, the antenna module 10 has a radiation surface facing the battery cover 50, where the radiation surface of the antenna module 10 is configured to radiate the first RF signal and the second RF signal. In other words, the battery cover 50 is located within a radiation range of the first RF signal and the second RF signal.

The battery cover 50 usually includes a back plate 510 and a frame 520 bendably connected with a periphery of the back plate 510. In an implementation, the number of the antenna module 10 is one or more, and all radiation surfaces of the antenna module 10 face the back plate 510. In another implementation, the number of the antenna module 10 is one or more, and all radiation surfaces of the antenna module 10 face the frame 520. In another implementation, the number of the antenna module 10 is one or more, when the number of the antenna module 10 is more, radiation surfaces of some antenna modules 10 face the back plate 10, and radiation surfaces of the rest antenna modules 10 face the frame 520. In the schematic view of this implementation, an example that the radiation surfaces of the antenna modules 10 face the frame 520 and the number of the antenna module 10 is two is taken for illustration. It should be noted that when the radiation surface of the antenna module 10 faces the back plate 510, the back plate 510 is located within the radiation range of the first RF signal and the second RF signal. When the radiation surface of the antenna module 10 faces the frame 520, the frame 520 is located within the radiation range of the first RF signal and the second RF signal.

Furthermore, the electronic device 1 in this implementation further includes a screen 70, and the screen 70 is disposed at an opening of the battery cover 50. The screen 70 is configured to display texts, images, and videos, etc.

Figure 36:
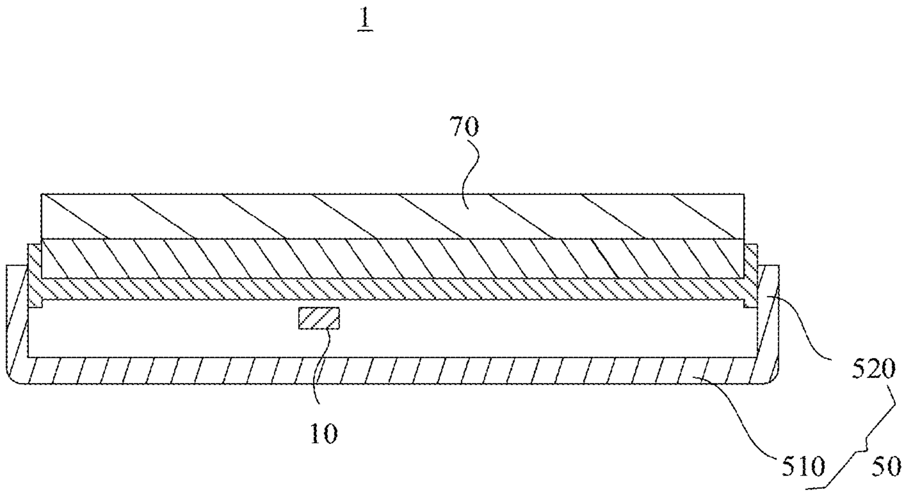
FIG. 36 is a cross-sectional view illustrating an electronic device provided in other implementations of the present disclosure.

Reference can be made to FIG. 36, which is a cross-sectional view illustrating an electronic device provided in other implementations of the present disclosure. The electronic device 1 includes a screen 70, the antenna module 10 has a radiation surface facing the screen 70, where the radiation surface of the antenna module 10 is configured to radiate the first RF signal and the second RF signal. In other words, the screen 70 is located within a radiation range of the first RF signal and the second RF signal.

The screen 70 may be, but is not limited to, a liquid crystal display (LCD) or an organic light emitting diode (OLED) display.

Furthermore, the electronic device 1 further includes a battery cover 50, and the screen 70 is disposed at an opening of the battery cover 50. The battery cover 50 usually includes a back plate 510 and a frame 520 bendably connected with a periphery of the back plate 510.

Although the implementations of the present disclosure have been shown and described above, it can be understood that the above implementations are exemplary and cannot be understood as limitations to the present disclosure. Those of ordinary skill in the art can change, amend, replace, and modify the above implementations within the scope of the present disclosure, and these modifications and improvements are also regarded as the protection scope of the present disclosure.

What is claimed is:

1. An electronic device, comprising:

a controller; and an antenna module, wherein the controller is electrically connected with the antenna module, and the antenna module is configured to operate under control of the controller; wherein the antenna module comprises:

a first antenna radiator configured to radiate a first radio frequency (RF) signal and resonate at a first frequency point;

a first parasitic radiator, wherein the first parasitic radiator and the first antenna radiator are located on a same plane and are spaced apart from each other, or the first parasitic radiator and the first antenna radiator are located on different planes; and the first parasitic radiator is coupled with the first antenna radiator to radiate the first RF signal, and the first parasitic radiator is configured to resonate at a second frequency point, the second frequency point being different from the first frequency point; and a second antenna radiator stacked with the first antenna radiator and configured to radiate a second RF signal, wherein a frequency band of the second RF signal is different from a frequency band of the first RF signal, wherein the first antenna radiator is a rectangular conductive patch, a length of the first antenna radiator ranges from 1.6~2.0 mm, and a width of the first antenna radiator ranges from 1.6~2.0 mm, and wherein the second antenna radiator is a rectangular conductive patch, a length of the second antenna radiator ranges from 2.0~2.8 mm, and a width of the second antenna radiator ranges from 2.0~2.8 mm;

a battery cover, wherein the battery cover comprises a back plate and a frame bendably connected with a periphery of the back plate, the antenna module has a radiation surface facing the frame, and the radiation surface of the antenna module is configured to radiate the first RF signal and the second RF signal.

2. The electronic device of claim 1, wherein the antenna module further comprises:

a second parasitic radiator, wherein the second parasitic radiator and the second antenna radiator are located on a same plane and are spaced apart from each other, or the second parasitic radiator is stacked with the second antenna radiator; and the second parasitic radiator is coupled with the second antenna radiator to radiate the second RF signal.

3. The electronic device of claim 2, wherein the antenna module further comprises:

a RF chip electrically connected with the first antenna radiator, wherein each of the first antenna radiator and the second antenna radiator is a conductive patch, and the first antenna radiator is farther away from the RF chip than the second antenna radiator, the frequency band of the first RF signal being higher than the frequency band of the second RF signal.

4. The electronic device of claim 3, wherein the second parasitic radiator is farther away from the RF chip than the second antenna radiator when the second parasitic radiator is stacked with the second antenna radiator.

5. The electronic device of claim 4, wherein the second antenna radiator defines a through hole, and the antenna module further comprises:

a feeding member, wherein the feeding member penetrates through the through hole and is electrically connected with the RF chip and the first antenna radiator, and the feeding member is insulated from the second antenna radiator.

6. The electronic device of claim 5, wherein the first parasitic radiator is implemented as a plurality of first parasitic radiators, and a center of the plurality of first parasitic radiators on a plane where the first parasitic radiator and the first antenna radiator are located is coincident with a center of the first antenna radiator.

7. The electronic device of claim 2, wherein the second antenna radiator is configured to resonate at a third frequency point, and the second parasitic radiator is configured to resonate at a fourth frequency point, the third frequency point being different from the fourth frequency point.

8. The electronic device of claim 2, wherein the antenna module further comprises:

a plurality of antenna units arranged in an array, wherein each antenna unit comprises the first antenna radiator, the first parasitic radiator, the second antenna radiator, and the second parasitic radiator, and a plurality of metallization-via-hole grids are defined between adjacent antenna units.

9. The electronic device of claim 2, wherein the antenna module further comprises:

a substrate configured to carry the first antenna radiator, the first parasitic radiator, the second antenna radiator, and the second parasitic radiator.

10. The electronic device of claim 9, wherein the second antenna radiator and the second parasitic radiator are embedded in the substrate.

11. The electronic device of claim 1, wherein the frequency band of the first RF signal is higher than the frequency band of the second RF signal, each of the first antenna radiator and the second antenna radiator is a conductive patch, and a size of the first antenna radiator is less than a size of the second antenna radiator.

12. The electronic device of claim 1, wherein the frequency band of the first RF signal is gr higher eater than the frequency band of the second RF signal, the first antenna radiator is a conductive patch, the second antenna radiator is a conductive patch and defines a first hollow structure penetrating through two opposite surfaces of the second antenna radiator, a size of an outer contour of the first antenna radiator is greater than or equal to a size of an outer contour of the second antenna radiator, and a difference between a size of the first antenna radiator and a size of the second antenna radiator is larger with increasing of an area of the first hollow structure.

13. The electronic device of claim 1, wherein the frequency band of the first RF signal is higher than the frequency band of the second RF signal, the first antenna radiator is a conductive patch and defines a first hollow structure penetrating through two opposite surfaces of the first antenna radiator, the second antenna radiator is a conductive patch and defines a second hollow structure penetrating through two opposite surfaces of the second antenna radiator; and a size of an outer contour of the first antenna radiator is less than or equal to a size of an outer contour of the second antenna radiator, and an area of the first hollow structure is greater than an area of the second hollow structure.

14. The electronic device of claim 1, wherein the first parasitic radiator is a rectangular conductive patch, the first parasitic radiator has a first edge close to the first antenna radiator and a second edge connected with the first edge, wherein a length of the first edge is greater than a length of the second edge, the first edge is configured to adjust a resonant frequency of the first parasitic radiator, and the second edge is configured to adjust an impedance matching degree between the first parasitic radiator and the first antenna radiator.

15. The electronic device of claim 1, wherein the frequency band of the second RF signal comprises frequency band n257, frequency band n258, and frequency band n261, and the frequency band of the first RF signal comprises frequency band n260; or the frequency band of the second RF signal comprises frequency band n260, and the frequency band of the first RF signal comprises frequency band n257, frequency band n258, and frequency band n261.

16. The electronic device of claim 1, wherein a distance between the first antenna radiator and a ground layer is less than or equal to 0.9 mm, and a distance between the second antenna radiator and the ground layer ranges from 0.3~0.6 mm.

17. The electronic device of claim 1, wherein the first antenna radiator comprises two first feeding points; and the second antenna radiator comprises two second feeding points.

* * * * *